Figure 1:
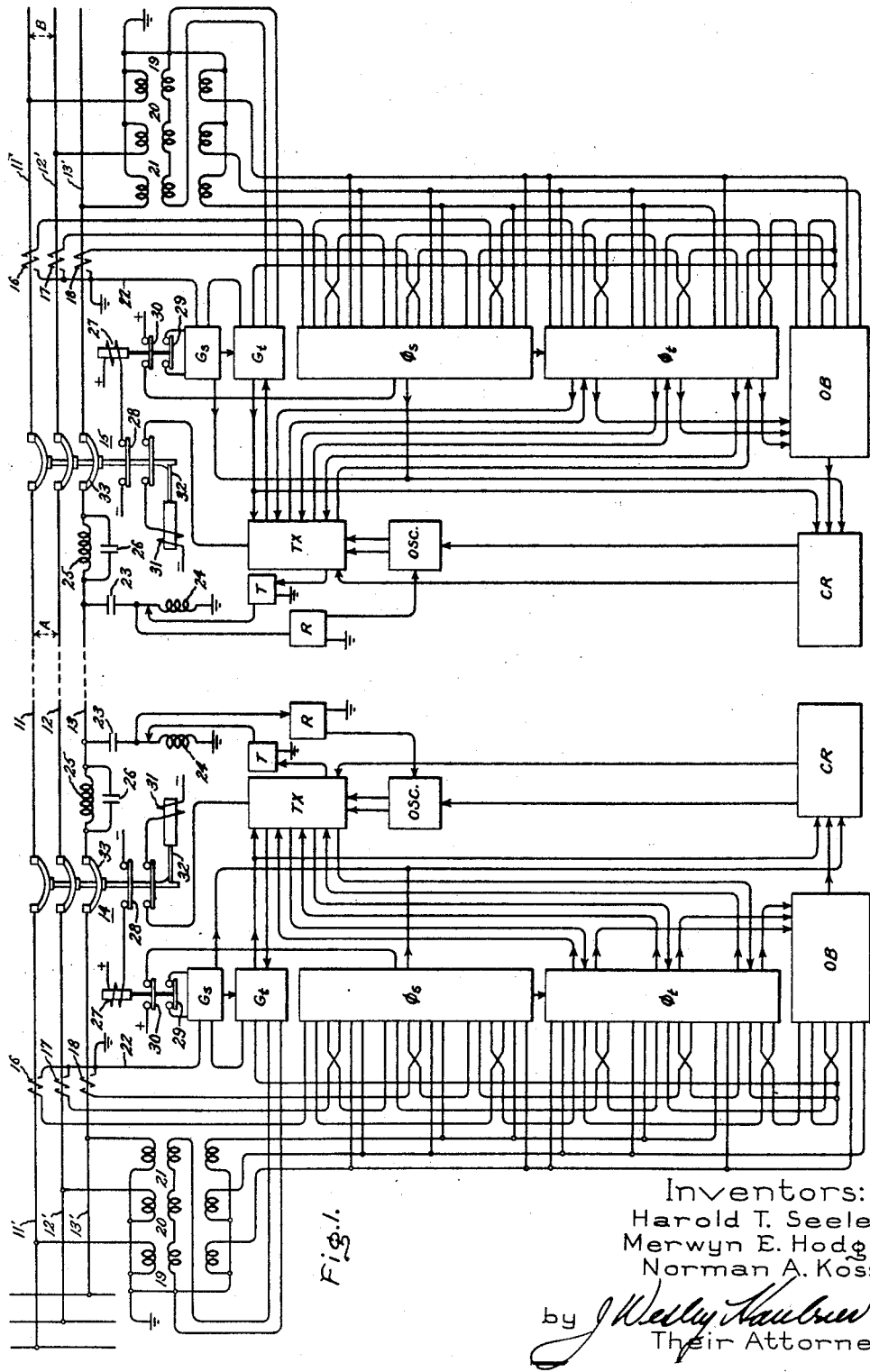

Inventors:
Harold T. Seeley,
Merwyn E. Hodges,
Norman A. Koss,
by J Wesley Haubner
Their Attorney.

Inventors:
Harold T. Seeley,
Merwyn E. Hodges,
Norman A. Koss,
by J. Wesley Haubner
Their Attorney.

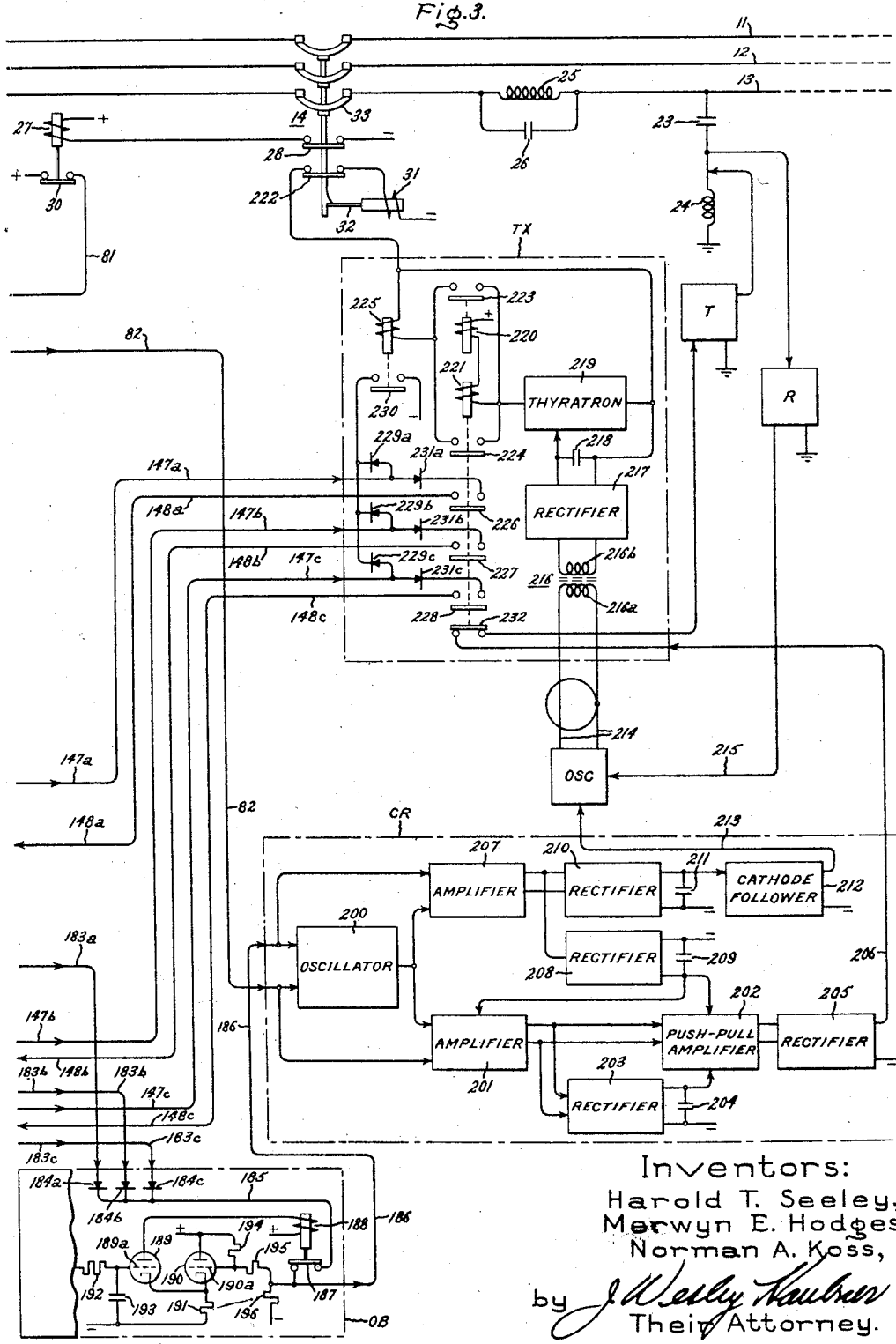

March 24, 1959 M. E. HODGES ET AL 2,879,454
FAULT RESPONSIVE PROTECTIVE SYSTEM FOR AN ELECTRIC
POWER TRANSMISSION LINE
Filed Dec. 8, 1954 4 Sheets-Sheet 4

Inventors:
Harold T. Seeley,
Merwyn E. Hodges,
Norman A. Koss,
by J. Wesley Haubner
Their Attorney.

United States Patent Office 2,879,454
Patented Mar. 24, 1959

2,879,454

FAULT RESPONSIVE PROTECTIVE SYSTEM FOR AN ELECTRIC POWER TRANSMISSION LINE

Merwyn E. Hodges and Norman A. Koss, Philadelphia, and Harold T. Seeley, Havertown, Pa., assignors to General Electric Company, a corporation of New York Application December 8, 1954, Serial No. 473,802

37 Claims. (Cl. 317—28)

This invention relates to fault responsive protective systems for electric power transmission lines, and more particularly to a directional-comparison pilot type transmission line protective system employing extremely high speed electronic relays.

The trend today in the field of electric power, principally perhaps for reasons of economy, is to operate high-voltage transmission lines at loads which approach system stability limits. In order to maintain stability and to preserve continuity of service to the electric power consumers, it is increasingly desirable in present day electric power transmission applications to provide protective relaying systems capable of extremely high speed response. A protective relaying arrangement which will respond to any fault condition on a transmission line within one cycle (based on the typical power system frequency of 60 cycles per second) would contribute greatly to the mitigation of damage caused by a fault and to the prevention of major system interruptions. Accordingly, it is a general object of this invention to provide for a high-voltage electric power transmission line, a fault responsive protective relaying system which will perform a preselected control function in less than one cycle after the occurrence of a fault condition.

A high-voltage transmission line typically conducts three-phase alternating current between two multipole high-speed circuit breakers located at opposite ends or terminals of the transmission line. In some instances the line may be tapped and employ circuit breakers at all terminals. In order to minimize the disturbance to the sound sections of the electric power system while removing a transmission line from service upon the occurrence of a fault condition, it is highly desirable to open all circuit breakers substantially simultaneously. This is especially true where the circuit breakers are called upon to reclose instantaneously. Therefore, another object of this invention is to provide for a high-voltage electric power transmission line, a fault responsive protective relaying system capable of supplying tripping impulses substantially simultaneously to the circuit breakers at all terminals of the line within one cycle following the occurrence of a fault at any point on the protected transmission line.

In a high speed selective protective relaying system for a transmission line it is necessary to provide a pilot channel for instantly conveying certain information from one terminal to all others. One well-known method of obtaining this necessary intercommunication is by carrier-current, wherein one of the conductors of the transmission line is used to carry a high frequency continuous signal from one terminal to the others. The signal is utilized to prevent or block tripping of the circuit breakers located at the terminals. By providing suitable components, the protective relaying system will operate as follows: if a fault occurs at a point remote from or external to the protected transmission line, carrier-current is transmitted from at least one of the terminals to block tripping of the circuit breakers at all other terminals. If a fault occurs on the protected transmission line, carrier-current transmission is immediately stopped at all terminals and all circuit breakers are tripped thereby isolating the faulted transmission line. It is therefore another object of this invention to provide a transmission line protective relaying system adaptable for use with conventional pilot channels and capable of selective response within one cycle following the occurrence of a fault condition.

The speed of operation of a conventional electromechanical relay is affected by the magnitude of the electric quantity to which it responds. Furthermore, the speed of operation of a conventional electromechanical relay is inherently limited by the inertia of its moving parts. Another object of this invention is to provide for a high-voltage transmission line protective relaying system, relays utilizing electronic elements to obtain a consistent overall operating speed of less than one cycle in response to a fault located at any point on the transmission line and regardless of the magnitude of fault current.

A further object of this invention is to provide a reliable transmission line protective relaying system utilizing electronic relay components.

It is another object of this invention to provide for a high-voltage electric power transmission line an extremely high-speed fault responsive protective electronic relaying system which is exceptionally sensitive and accurate regardless of supply voltage fluctuations or ambient temperature variations.

Another object of this invention is to provide an improved impedance type relay utilizing electronic elements to produce an output control signal within an extremely short time interval when energized by alternating voltage and current in predetermined relationship.

Another object of this invention is to provide an improved mho type relay utilizing electronic elements to produce an output control signal within an extremely short time in response to two alternating electric quantities having a predetermined phase relationship with respect to each other.

Still another object of this invention is to provide an electronic relaying system including impedance and mho relay elements coordinated in a manner to produce an output control signal only when both elements are operably energized but not until at least a predetermined time interval has elapsed following operable energization of the impedance relay element.

In carrying out our invention in one form, we provide a phase fault responsive protective relaying system of the directional-comparison type for a high-voltage transmission line, which line is equipped with suitable carrier-current transmitting and receiving means at each terminal. The relaying system operates to initiate tripping of a circuit breaker located at each terminal of the protected transmission line within one cycle on a 60 cycles per second basis in response to the occurrence of a short circuit between conductors of the protected transmission line (a phase fault). The relaying system comprises at each terminal an impedance type electronic relay, a mho type electronic relay, and suitable electronic control and auxiliary relays. Alternating currents and voltages, which are representative of the transmission line current and voltage both in phase and magnitude, are derived from the transmission line by suitable current transformers and potential transformers respectively and supplied to the impedance and mho type relays. The ratio of transmission line voltage to current represents the apparent impedance of the transmission line with respect to the terminal at which these quantities are measured. The impedance and mho type relays operate in response to apparent impedance values which indicate that a phase fault has occurred within their respective operating regions.

In the impedance type electronic relay, an operating quantity comprising a voltage related to the transmission line current by a preselected constant impedance tends to cause operation, while a pair of restraint quantities restrain operation. One restraint quantity comprises a voltage proportional to the transmission line voltage which is related to the line current by the apparent impedance, and the other restraint quantity comprises a voltage related to the line current by another preselected constant impedance vectorially subtracted from the voltage proportional to line voltage. Whenever the magnitude of the operating quantity exceeds the magnitude of either one of the restraint quantities, the impedance type relay rapidly responds to produce a first control signal. The reach or operating region of this relay is determined by the aforesaid preselected impedances, and the relay is made to respond to apparent impedance values corresponding to any phase fault located on the protected transmission line and beyond it by a suitable margin. This relay also develops a coordinating signal which is supplied to the mho type relay after a definite time interval in response to a phase fault within its reach. The first control signal acts through an electronic control relay to energize a carrier-current transmitting means which instantly generates continuous signal current. The receiving means located at each of the other terminals of the transmission line is energized by this signal current to disable an associated electronic auxiliary relay which is employed to initiate tripping of the associated circuit breaker. Thus, the immediate effect of the phase fault is to prevent or block tripping of the circuit breakers.

In the mho type electronic relay, an operating quantity is derived by vectorially subtracting a voltage proportional to the transmission line voltage from a voltage related to the transmission line current by a preselected constant impedance, and the phase angle of this operating quantity with respect to a polarizing quantity comprising the voltage proportional to line voltage is measured. Whenever this phase angle is less than 90 electrical degrees, a phase fault within the operating region or reach of the mho type relay is indicated, and this relay rapidly responds with an attempt to produce a second control signal. The second control signal cannot be produced, however, until a coordinating signal is received from the impedance type relay. The reach of the mho type relay, as determined by the preselected constant impedance, encompasses the protected transmission line, but does not extend to any phase fault located behind the local terminal with respect to the remote terminals. The second control signal acts through the control relay to deenergize the local carrier-current transmitting means, thus discontinuing the signal current, and to energize the auxiliary relay in an attempt to trip the local circuit breaker. Tripping of the local circuit breaker is permitted only after the auxiliary relay is unblocked by deenergization of the local carrier-current receiving means as a result of the discontinuance of signal current at all of the remote terminals. In this manner, the circuit breaker at each terminal is tripped to remove the protected transmission line from service whenever a phase fault occurs on the protected transmission line. A component of the second control signal is also utilized to energize an operation indicator or target whenever the auxiliary relay operates to initiate tripping of the local circuit breaker.

Figure 2:
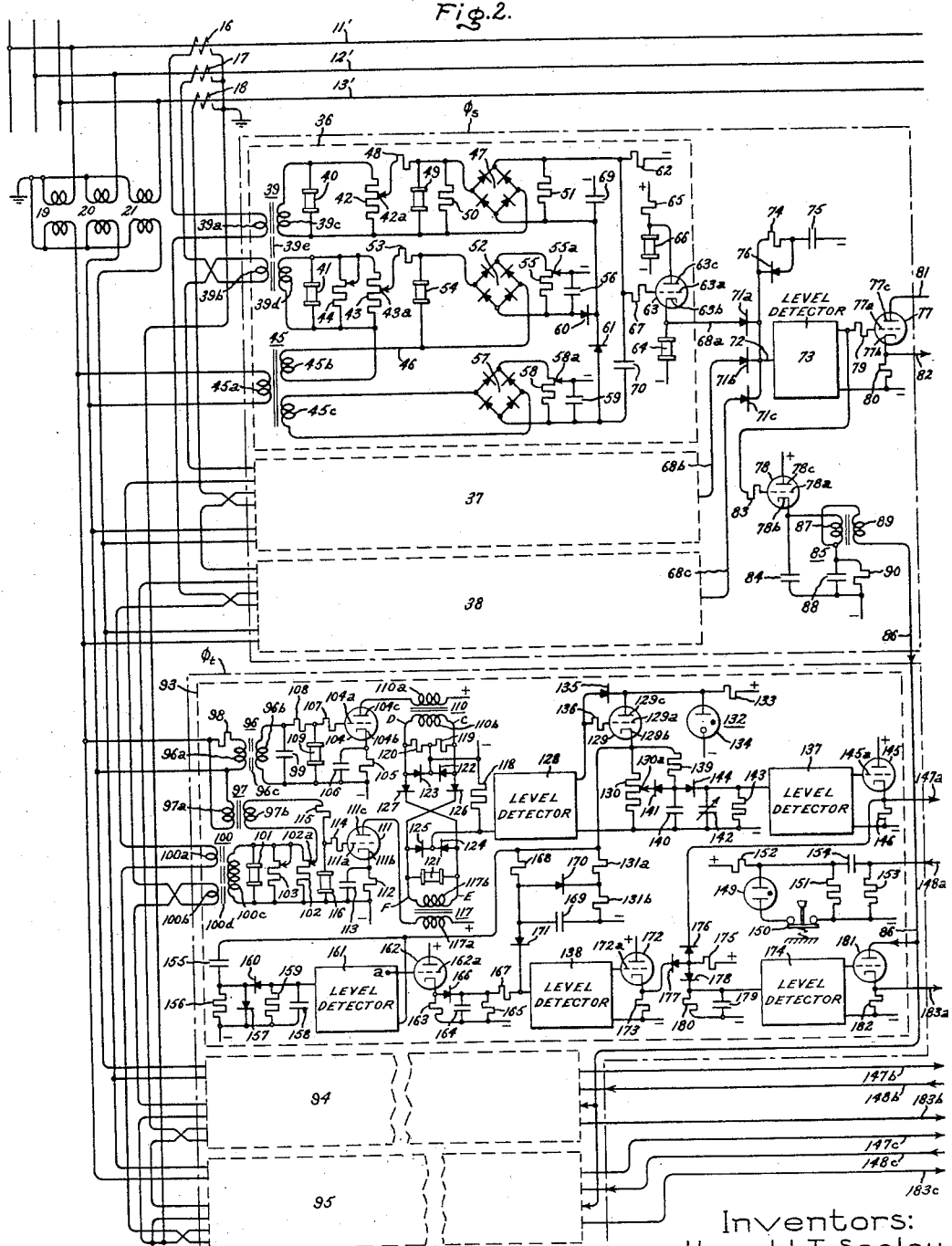
Figure 4A:
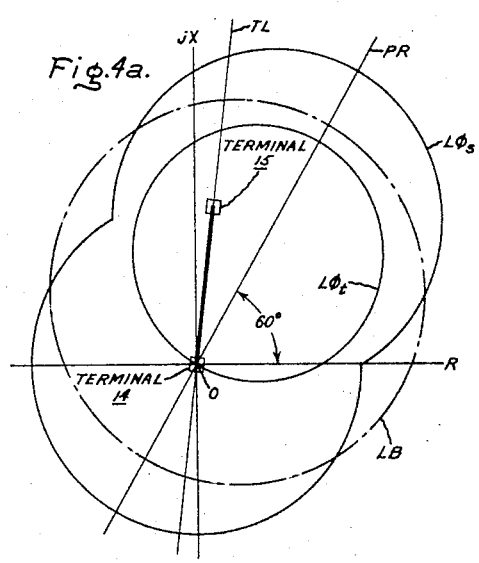
Figure 4B:
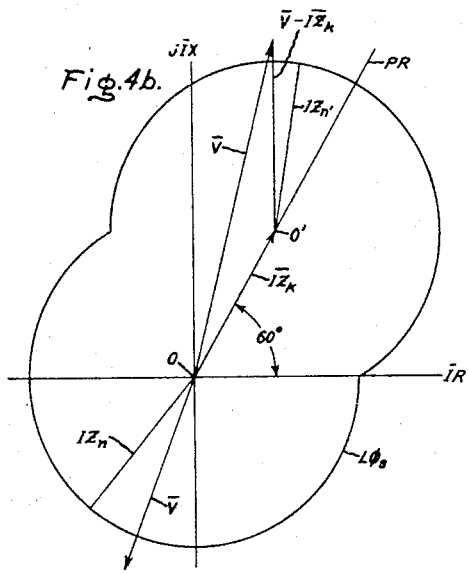
Figure 4C:
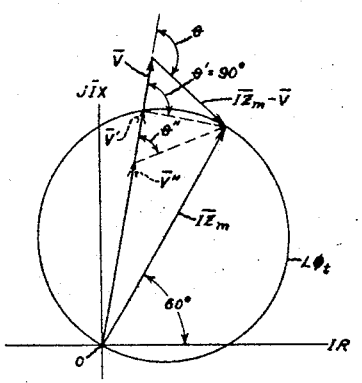
Figure 5:
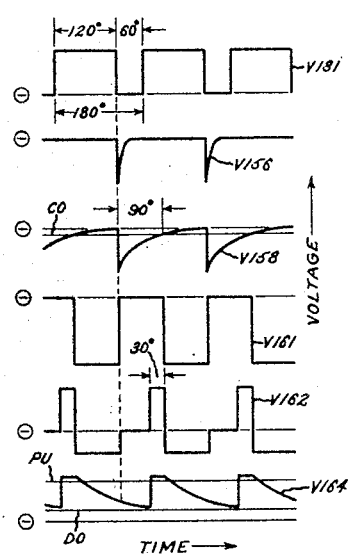

Our invention will be better understood and further objects and advantages will be apparent from the following description taken in conjunction with the accompanying drawings, in which Fig. 1 is a schematic diagram, partly in block form, of a high-voltage transmission line having a fault responsive protective relaying system of the directional-comparison carrier-current pilot type which embodies a preferred form of our invention; Figs. 2 and 3 (Sheets 2 and 3) taken together are a more detailed schematic circuit diagram of the phase fault relaying apparatus shown in block form at one terminal of the transmission line of Fig. 1, Fig. 2 illustrating the detailed circuitry of the impedance and mho type relays forming part of our invention and Fig. 3 showing the various devices functionally associated with the relays of Fig. 2; Figs. 4a, 4b, and 4c are graphical representations of the operating characteristics of the impedance and mho type relays, with Fig. 4a having impedance coordinates and Figs. 4b and 4c having voltage coordinates; and Fig. 5 is a family of curves representing the wave forms of various voltages appearing in the gap time interval detecting circuit of our invention.

To illustrate a preferred embodiment of our invention we have shown in Fig. 1 a high-voltage transmission line protective relaying system of the directional-comparison carrier-current pilot relaying type. As can be seen in Fig. 1, a 3-phase transmission line, represented by conductors 11, 12 and 13, extends between two 3-pole circuit breakers 14 and 15. Circuit breakers 14 and 15 are located at what will be referred to hereinafter as the local and remote terminals, respectively, of the transmission line. The illustrated transmission line may be of the type employed in an electric power system to transmit 3-phase, alternating current of power frequency, such as 60 cycles per second, from one terminal to the other at very high voltage, e.g., 330,000 volts phase-to-phase. Identical protective relaying equipment is provided at each terminal to open quickly and simultaneously both circuit breakers 14 and 15, thereby isolating the transmission line, upon the occurrence of an internal fault, i.e., upon the occurrence of a short circuit between phase conductors (phase fault) or between a conductor and ground (ground fault) at some point along the line between the opposite terminals. The necessary intercommunication between the identical relaying equipments is accomplished in the illustrated embodiment of our invention by utilizing conductor 13 as a channel for transmission of high-frequency unmodulated carrier-current. Although we have illustrated only a two terminal transmission line, our invention is also adaptable to transmission lines having three or more terminals.

As shown in Fig. 1, at each terminal three instrument current transformers 16, 17, and 18 and three instrument potential transformers 19, 20, and 21 are coupled to conductors 11', 12' and 13' connecting each circuit breaker 14 and 15 to a 3-phase supply source or load bus of the power system. The secondary circuits of these instrument transformers are connected to certain relays at each terminal to supply current and voltage quantities which accurately reflect the current and voltage conditions existing at the respective transmission line terminals. The relays which respond to these quantities may be divided into two general groups. A first group detects merely the existance of a fault condition, while a second group has directional characteristics and cooperates to determine the position of the fault in the power system. These relays, together with other relays which perform associated functions, will first be described very generally. Then we will describe in detail the elements of our invention.

In the first group of relays mentioned above, an impedance relay $\phi s$ located at each terminal, as shown in Fig. 1, responds immediately to a predetermined condition of line current and voltage which indicates that a phase fault has occurred. The fault thus detected may be located either internal to or external to the protected transmission line. Operation of the impedance relay $\phi s$ causes carrier-current to be transmitted over conductor 13, and carrier-current, as will be explained below, is employed to prevent opening of the circuit breakers. Impedance relay $\phi s$ will be referred to as a "phase starting" relay because it responds to a phase fault to start the transmission of carrier-current. Similarly, an overcurrent relay Gs is provided at each terminal to respond quickly whenever current in the residual circuit 22 of the current transformer connections reaches a magnitude which indicates that a ground fault has occurred. Relay Gs also operates to initiate the transmission of carrier-current and will be referred to as a "ground starting" relay. Thus, upon the occurrence of either a phase or a ground fault, carrier-current transmission is immediately started at each terminal.

A carrier-current transmitter T is used at each terminal to transmit the high frequency carrier-current. As can be seen in Fig. 1, a coupling capacitor 23 with sufficient insulation to withstand line voltage is connected in series circuit relationship with a drain coil 24 between conductor 13 and ground. Capacitor 23 easily passes high-frequency carrier-current, but presents a high impedance to the line current of power frequency. A parallel resonant circuit comprising an inductance 25 and a capacitor 26 tuned to the carrier-current frequency is connected in series circuit relation with conductor 13 to provide a wave trap which confines the carrier-current to the protected transmission line extending between opposite terminals, without introducing any appreciable impedance to the current of power frequency. Transmitter T is connected to capacitor 23, and, when energized by a control relay CR in response to operation of either the phase starting relay $\phi s$ or the ground starting relay Gs, the transmitter will generate a continuous signal current at a high frequency, such as 100,000 cycles per second. This signal current will follow two parallel paths to ground: through the local drain coil 24, and by way of coupling capacitor 23 and conductor 13 through the drain coil 24 located at the opposite terminal; and a substantial carrier-current signal voltage is developed across drain coil 24. A carrier-current receiver R is connected in parallel circuit relation with the drain coil 24 at each terminal and is tuned to the frequency of the carrier-current. Receiver R controls an auxiliary relay OSC in a manner to prevent or block tripping of the associated circuit breaker, 14 or 15, whenever the receiver is energized by the carrier-current signal voltage.

To determine the position of a fault, a mho type distance relay $\phi t$ and a ground current directional relay Gt are provided at each terminal. These relays operate immediately in response to the occurrence of phase and ground faults, respectively, located in the direction of the protected transmission line as viewed from the local terminal. Either relay $\phi t$ or relay Gt when operated performs two functions: it immediately stops the transmission of carrier-current by the associated transmitter T, and it attempts to open or trip the associated circuit breaker. The mho type distance relay $\phi t$ is designated a "phase tripping" relay, and the ground current directional relay Gt is designated a "ground tripping" relay.

The basic operation of the overall relaying system should now be understandable. As already stated, it is desired to open simultaneously both circuit breakers 14 and 15 upon the occurrence of an internal fault. As a corollary, it is desired to prevent tripping of either circuit breaker whenever a fault condition develops external to the protected transmission line. Assume first an internal phase fault at A in Fig. 1. The phase starting relay $\phi s$ at both terminals will detect the fault and immediately start carrier-current. Because the fault is located on the protected transmission line, the phase tripping relays $\phi t$ at both terminals will operate to stop carrier-current and attempt tripping. Consequently, carrier-current transmission is stopped at both terminals, tripping is no longer blocked, and both circuit breakers 14 and 15 will open. Assume now an external phase fault at B in Fig. 1. The phase starting relay $\phi s$ at both terminals will detect the fault and immediately operate to start carrier-current. Assuming that the fault is within the reach of the phase tripping relay $\phi t$ located at the terminal of circuit breaker 14, this relay will operate to stop carrier-current transmission from this terminal and attempt to trip circuit breaker 14. However, at the terminal of circuit breaker 15, the phase fault is in the reverse direction to that required for operation of relay $\phi t$, and the phase tripping relay $\phi t$ at this terminal will not respond to the fault. As a result, carrier-current continues to be transmitted from this terminal and to be received at the opposite terminal, thereby blocking the attempt to trip circuit breaker 14. No attempt to trip circuit breaker 15 is made. The operation of the relay system will be the same as described above for ground faults with the exception that ground relays Gs and Gt are affected instead of phase relays $\phi s$ and $\phi t$.

To insure correct operation of the relaying system during external faults such as a phase fault at B in Fig. 1, it is essential that carrier-current is started at the terminal "seeing" an external fault (terminal 15), in order to block tripping, before the tripping relay operates at the terminal "seeing" an internal fault (terminal 14). To provide for this sequence of operation, starting relay $\phi s$ coordinates with the associated tripping relay $\phi t$ in a manner whereby the tripping relay output control signal at terminal 14 is delayed until it is assured that the starting relay at terminal 15 has had an opportunity to complete its carrier-current starting function. This coordination, which is also provided between relays $\phi s$ and $\phi t$ at terminal 15, will be explained in detail below. Similar coordination is provided between the ground relays Gs and Gt.

During a circuit breaker closing operation, all poles of the breaker may not make contact at the identical instant of time. Whenever this uneven or sequential pole closure occurs, momentary unbalanced currents can flow which may appear to the ground relays Gs and Gt as an internal ground fault. Therefore, an electromagnetic relay 27 controlled by an auxiliary switch 28 of the circuit breaker is provided at each terminal as shown in Fig. 1. Relay 27 is energized and its switch contacts 29 and 30 close only after all three poles of the circuit breaker are closed. Until contact 29 is closed the necessary coordinating signal between relays Gs and Gt can not be produced, and in this manner false output from ground tripping relay Gt is prevented during sequential pole closure. Contact 30 is employed to perform a circuit controlling function in connection with phase starting relay $\phi s$, as will be fully explained below.

Under certain conditions of power swings in the electric power system, which are power surges such as caused by the removal of a short circuit condition external to the protected line, or by the loss of synchronism between a generator and the system, the phase relays $\phi s$ and $\phi t$ may operate to give a false indication of an internal fault. Therefore, an out-of-step blocking relay OB is provided to prevent or block the output control signal of the phase tripping relay $\phi t$ whenever a power swing is in progress.

As shown in Fig. 1, control relay CR, auxiliary relay OSC, and a tripping auxiliary unit TX are provided at each terminal to convert tripping relay signals into a signal suitable for energizing a trip coil 31 of the associated circuit breaker. Energization of trip coil 31 actuates a latch 32 thereby releasing switch member 33 of the circuit breaker for rapid circuit interrupting movement. Another function of the tripping auxiliary unit TX is to permit target operation in the tripping relay which operated to trip the circuit breaker. Unit TX also prevents energization of the associated transmitter T while the circuit breaker is opening.

To understand more fully the operation of our invention, reference should now be made to Figs. 2 and 3 and to the following description. Figs. 2 and 3 show, partly in block form, a schematic circuit diagram of the various components of the phase starting and tripping relays, $\phi s$ and $\phi t$ respectively, and of the associated relay units located at one terminal of the transmission line, e.g., the terminal of circuit breaker 14. It will be understood from the foregoing that if desired the ground starting and tripping relays Gs and Gt which have been shown in block form in Fig. 1 may comprise suitable electromagnetic relays used heretofore to perform ground starting and tripping functions in other protective relaying systems. We prefer, however, to use for Gs and Gt the improved electronic relays which are fully described and claimed in a copending application S.N. 469,947, filed on November 19, 1954, by Merwyn E. Hodges and Norman A. Koss and assigned to the present assignee.

Phase starting relay $\phi s$

Phase starting relay $\phi s$ operates to start carrier-current transmission immediately in response to the occurrence of a phase fault. The fault current flowing in the transmission line at the local terminal during a phase fault tends to operate the relay, while the transmission line voltage at the local terminal tends to restrain operation. Relay $\phi s$ is an impedance type relay, that is, it responds in effect to the magnitude of the ratio of transmission line voltage to current. This ratio defines impedance looking into the transmission line from the local terminal and is designated apparent impedance.

To illustrate the operating characteristic of phase starting relay $\phi s$, reference should be made to the graphical representations in Figs. 4a and 4b. Fig. 4a is a conventional impedance diagram in which abscissa R and ordinate jX describe values of resistance and inductive reactance respectively as determined by the vectorial relationship between transmission line voltage and current measured at terminal 14. The origin O represents zero values of resistance and reactance with respect to this terminal. Both coordinates R and jX are scaled equally and in the same units, such as ohms, on a phase-to-neutral basis. A transmission line has a determinable impedance which can be represented, for example, by a portion of a line TL shown on Fig. 4a. The protected section of the transmission line, which extends from local terminal 14 to remote terminal 15, is indicated by the heavy portion of line TL. The operating characteristics of the illustrated protective relays $\phi s$ and $\phi t$ are arranged, for reasons and in a manner to be explained below, to be symmetrical about a line PR disposed at approximately 60 degrees from the R axis. A figure-8-shaped curve L$\phi s$ shown in Fig. 4a represents the locus of impedance values which define the operating limits of phase starting relay $\phi s$ as it is adjusted to operate in accordance with the preferred embodiment of our invention. Thus, whenever the apparent impedance, as indicated by current and voltage quantities supplied to relay $\phi s$ by the instrument transformers, falls within the area circumscribed by locus L$\phi s$, phase starting relay $\phi s$ will operate. It is well known to those skilled in the art that under normal load conditions the apparent impedance of the transmission line will fall outside of the operating range of relay $\phi s$ as defined by locus L$\phi s$, while upon the occurrence of any phase fault condition on the protected line or nearby, the apparent impedance will instantly change to a value which will cause relay $\phi s$ to operate.

Fig. 4b, which is a graphical representation of the operating characteristics of phase starting relay $\phi s$ in terms of voltage, has been constructed by multiplying the ohmic coordinates R and jX of Fig. 4a by current $\bar{I}$ flowing in the transmission line from terminal 14 toward terminal 15. Absscissa $\bar{I}R$ and ordinate $j\bar{I}X$ of Fig. 4b describe values of resistive and reactive components respectively of voltage produced by current $\bar{I}$. As can be seen in Fig. 4b, the preferable operating characteristic of relay $\phi s$, defined by locus L$\phi s$, comprises two overlapping circles: a non-offset circle having its center at origin O and an offset circle having its center at a point O' located on line PR. The non-offset circle has a radius of $IZn$ wherein $Zn$ is an impedance of predetermined magnitude which impedance is built into relay $\phi s$ in a manner to be described presently. The offset circle has a radius of $IZn'$ wherein $Zn'$ for the purposes of the illustrated embodiment of our invention is the same as impedance $Zn$. The center O' of the offset circle is offset from the origin O by $\bar{I}\bar{Z}k$, wherein $\bar{Z}k$ is a predetermined vector impedance built into relay $\phi s$ in a manner to be described presently. The vectors $\bar{V}$ shown in Fig. 4b are voltages in the relay that represent transmission line voltages at terminal 14 during typical external phase faults, and accordingly $\bar{V}$ is proportional to current $\bar{I}$ multiplied by the apparent impedance to the fault. Within relay $\phi s$ the offset voltage $\bar{I}\bar{Z}k$ is vectorially subtracted from voltage $\bar{V}$ to derive a net voltage $\bar{V}-\bar{I}\bar{Z}k$ which is utilized to restrain operation of relay $\phi s$. As demonstrated by Fig. 4b, whenever the magnitude of either the voltage $\bar{V}$ or the net voltage $\bar{V}-\bar{I}\bar{Z}k$ is less than voltage $IZn$ ($IZn'$ equals $IZn$), the apparent impedance to the fault is within locus L$\phi s$, and relay $\phi s$ operates.

To obtain the operating characteristic described above, the circuitry of phase starting relay $\phi s$ shown in Fig. 2 is used. This relay comprises three components enclosed by broken-line rectangles 36, 37, and 38 in Fig. 2. Each component responds to a phase fault involving a different pair of transmission line conductors. Since all three components are internally identical, only the circuits of component 36 have been shown in detail. Component 36 is supplied by the alternating currents in the Y-connected secondary windings of instrument current transformers 16 and 17 which are coupled to transmission line conductors 11' and 12' respectively. Component 36 is also supplied by the alternating voltage between conductors 11' and 12' as detected by Y—Y-connected instrument potential transformers 19 and 20. Thus, component 36 is supplied by electric quantities which will instantly reflect any fault condition involving phase conductors 11' and 12' or the transmission line circuits connected thereto. Similarly, component 37 is supplied by current transformers 17 and 18 and by potential transformers 20 and 21, and this component will respond to any fault condition involving phase conductors 12' and 13' or the transmission line circuits connected thereto. Again, component 38 is supplied by current transformers 18 and 16 and by potential transformers 21 and 19, and this component will respond to any fault condition involving phase conductors 13' and 11' or the transmission line circuits connected thereto.

As shown in Fig. 2, component 36 of relay $\phi s$ is provided with suitable transforming means 39 which, for the purposes of the illustrated embodiment of our invention, preferably comprises a pair of primary windings 39a and 39b, a pair of secondary windings 39c and 39d, and a common iron core 39e which has at least one air gap. The primary windings 39a and 39b are connected in the secondary circuits of current transformers 16 and 17 respectively. These two primary windings have an equal number of turns and are arranged in opposing relationship whereby net ampere turns in the transforming means 39 is determined by the vectorial difference between the transmission line currents flowing in conductors 11' and 12'. Thus, the primary windings 39a and 39b effectively simulate a single primary winding supplied by current from delta-connected current transformers. During a phase-to-phase fault between conductors 11' and 12', the fault currents flowing in these two conductors will have equal magnitudes but will be 180 electrical degrees out-of-phase, and the difference current will be 2$\bar{I}$ where $I$ is the magnitude of current flowing in the conductors.

Transforming means 39 derives across each secondary winding 39c and 39d a voltage representative of the difference current in transmission line conductors 11' and 12' both in magnitude and phase over the operating range of current while imposing minimum burden on current transformers 16 and 17. The magnitude of voltage across each secondary winding and the phase angle by which it leads the net current in the primary windings is determined by the amount of load in the secondary circuits. Open circuit secondary voltages lead the net current by 90 electrical degrees. The effective secondary load resistance in the illustrated embodiment of our invention is preselected to cause the secondary voltages to lead the net current by 60 electrical degrees. Due to the high percentage of total primary current used for magnetizing iron core 39e and its air gap, initial transient D.-C. offset in fault current wave form will not be appreciably reproduced in the secondary voltage. The transforming means 39 also serves as a desirable means for insulating succeeding relay circuits from the current transformer connections.

Because the succeeding relaying circuits are designed to operate over a wide range of fault current magnitudes, it is possible that during a fault condition of maximum current an extremely large voltage may be induced in the secondary windings 39c and 39d. To prevent injury to the insulation of the secondary windings which might otherwise be damaged by such a large voltage, voltage limiters 40 and 41 are connected across secondary windings 39c and 39d respectively. Each voltage limiter has a non-linear current-voltage characteristic, that is, the ohmic value of the limiter decreases with increasing voltage applied across it so that current will increase at a greater rate than voltage. Many such non-linear current voltage characteristic devices are known in the art, and for the purposes of the illustrated embodiment of our invention we prefer at present to use a special ceramic resistance material comprising silicon carbide crystals held together by a suitable binder, such as described and claimed in U.S. Patent 1,822,742, issued to Karl B. McEachron on September 8, 1931. Each limiter, 40 or 41, provides means for increasing secondary load as the respective secondary voltage increases thereby limiting the maximum possible peak value of secondary voltage to a safe level without interfering with measurement accuracy at the normally smaller values of voltage.

Transforming means 39 is loaded by an adjustably tapped resistor 42 connected across secondary winding 39c. The voltage appearing across the tapped portion of resistor 42, as determined by the position of a slider 42a, has a fixed relationship to the difference current producing this voltage. This fixed relationship is in units of ohms and is termed "replica impedance." The particular magnitude of this replica impedance is $Zn$. During a phase-to-phase fault condition between conductors 11' and 12', the magnitude of voltage across the tapped portion of resistor 42 is $2\bar{I}Zn$. It should be recognized that one-half this voltage is the radius of the non-offset circle characteristic of relay $\phi s$ as shown in Fig. 4b. (The coordinates of Fig. 4b are scaled on the conventional phase-to-neutral basis, i.e., values of impedance are measured along one conductor from the local terminal to the fault. Since during a phase-to-phase fault the apparent impedance of the transmission line is necessarily twice the phase-to-neutral ohms to the fault, i.e., the impedance is measured from the local terminal to the fault and back again, it is necessary to use a conversion factor of ½ when reproducing the voltage quantities detected at the local terminal on the graphical representation of Fig. 4b.) It is particularly convenient in the illustrated embodiment of our invention to designate impedance $Zn$ as impedance $Zn'$ also, so that one-half $2IZn'$, which is the radius of the offset circle characteristic shown in Fig. 4b, is the same as $IZn$. Slider 42a is adjusted to obtain the desired magnitude of both $Zn$ and $Zn'$, which magnitude, for the purposes of the illustrated embodiment of our invention, preferably is substantially equal to the impedance of the protected transmission line extending between terminals 14 and 15. It should be apparent that a unit with a separately adjusted slider followed by duplicate circuits and restrained by only the offset restraint voltage could be provided if it were desired to make $Zn'$ different from $Zn$.

Transforming means 39 is loaded by another adjustably tapped resistor 43 connected across secondary winding 39d. In addition, a rheostat 44 is provided across winding 39d to permit a shift of the phase relationship of derived voltage with respect to the net primary current. The fixed relationship of voltage appearing across the tapped portion of resistor 43 to the difference current producing this voltage is replica impedance $\bar{Z}k$. The voltage across the tapped portion of resistor 43 is $2\bar{I}\bar{Z}k$ during a phase-to-phase fault condition between conductors 11' and 12'. It should be recognized that one-half this voltage vector determines the location of the center O' of the offset circle characteristic of relay $\phi s$ as shown in Fig. 4b. The resistance value of rheostat 44 is selected to obtain the desired phase angle characteristic of replica impedance $\bar{Z}k$, and a slider 43a of tapped resistor 43 is adjusted to obtain the desired magnitude of $\bar{Z}k$. For the purposes of the illustrated embodiment of our invention, the desired phase angle is 60 degrees and the desired magnitude is approximately equal to $Zn$.

The voltage between transmission line conductors 11' and 12' is supplied via potential transformers 19 and 20 to suitable transforming means 45 in component 36 of phase starting relay $\phi s$. This transforming means comprises, for example, an iron core transformer 45 having a primary winding 45a connected to potential transformers 19 and 20 and a pair of independent secondary windings 45b and 45c as illustrated in Fig. 2. Transformer 45 derives across each secondary winding a voltage which represents the transmission line voltage between conductors 11' and 12' both in magnitude and phase, and also insulates succeeding relay circuits from the potential transformer connections. During a phase-to-phase fault between conductors 11' and 12', the derived voltage is directly proportional to $2\bar{I}\bar{Z}f$ where $2\bar{Z}f$ is the apparent impedance of the transmission line from the local terminal to the fault location and back and $\bar{I}$ is the current flowing in conductors 11' and 12'. This derived voltage is designated $2\bar{V}$, with $\bar{V}$ representing the voltage drop from the local terminal to the fault location due to current $\bar{I}$ flowing through the phase-to-neutral impedance $\bar{Z}f$. One terminal of secondary winding 45b is connected to a lead 46 and the other terminal is coupled to tapped resistor 43 in a manner to develop between lead 46 and slider 43a a net voltage comprising voltage $2\bar{I}\bar{Z}k$ subtracted from voltage $2\bar{V}$. One half the magnitude of net voltage $2(\bar{V}-\bar{I}\bar{Z}k)$ appearing between lead 46 and slider 43a has been shown in Fig. 4b.

The effect of a three-phase transmission line fault upon the operating characteristic of phase starting relay $\phi s$ will now be considered. The difference current in transmission line conductors 11' and 12' during a balanced three-phase fault condition is $\sqrt{3}\,\bar{I}$, since the fault currents flowing in these conductors have equal magnitudes I and are 120 degrees out-of-phase. Thus the magnitude of derived voltage measured across the tapped portion of resistor 42 is $\sqrt{3}\,IZn$. Similarly the derived voltage across the tapped portion of resistor 43 is $\sqrt{3}\bar{I}\bar{Z}k$. The voltage derived by transformer 45 during the balanced three-phase fault is $\sqrt{3}\,\bar{V}$, since $\bar{V}$ is defined as the voltage drop to the fault in one conductor only. Thus the net voltage between slider 43a and lead 46 is $\sqrt{3}\,(\bar{V}-\bar{I}\bar{Z}k)$. The voltage quantities detected at the local terminal during a three-phase fault have been reproduced on Fig. 4b by using a conversion factor of $1/\sqrt{3}$ instead of ½. It should therefore be apparent that our phase starting relay $\phi s$ has the same operating characteristic in response to either phase-to-phase or three-phase fault conditions. For convenience, hereafter in this specification we will refer to the voltage across the tapped portion of resistor 42 merely as IZn, the voltage between slider 43a and lead 46 merely as $\bar{V}-\bar{I}\bar{Z}k$, and the voltage across secondary winding 45c of transformer 45 merely as $\bar{V}$. The succeeding relay circuits respond to the relative magnitudes of these voltages, as will be apparent from the following description.

Voltage IZn is utilized to operate relay $\phi s$. This voltage is supplied to suitable rectifying means, such as the full-wave bridge type rectifier 47 illustrated in Fig. 2, where it is converted to a more useful unidirectional operating voltage. A voltage limiting circuit comprising a resistor 48 and a voltage limiter 49 is provided between resistor 42 and rectifier 47 to protect the rectifier from damaging high voltage levels. Limiter 49 may be similar to limiters 40 and 41 described above. As voltage IZn rises to excessively high values, the resistance of limiter 49 becomes less and a non-linearly increasing voltage drop is produced across resistor 48 thereby limiting the voltage level at rectifier 47. A loading resistor 50 is connected in parallel with voltage limiter 49 to reduce the magnitude of voltage available at rectifier 47 by a fixed percentage of IZn during normal, relatively low voltage levels. This fixed percentage is selected so that the magnitude of the unidirectional operating voltage will be just equal to the resulting magnitude of effective restraint voltage whenever IZn is equal to the magnitude of $\bar{V}-\bar{I}\bar{Z}k$ or $\bar{V}$.

Voltage $\bar{V}-\bar{I}\bar{Z}k$ is utilized to restrain operation of relay $\phi s$. This voltage is supplied to suitable rectifying means, such as the full-wave bridge type rectifier 52 illustrated in Fig. 2, where it is converted to a more useful unidirectional restraint voltage. A voltage limiting circuit comprising a resistor 53 and a voltage limiter 54, similar respectively to resistor 48 and voltage limiter 49 described above, is provided between tapped resistor 43 and rectifier 52 to protect the rectifier from damaging high voltage levels. An adjustably tapped resistor 55 is connected between the positive and negative D.-C. terminals of rectifier 52. A slider 55a of resistor 55 is connected to a negative bus represented by the symbol (−). (The symbols + and − are used throughout the drawings to represent the positive bus and negative bus respectively of a unidirectional supply voltage source, such as a battery, which has not been shown for the sake of drawing simplicity.) The unidirectional voltage appearing between slider 55a and the negative terminal of rectifier 52 is smoothed by a filter capacitor 56, and this voltage, which comprises the effective offset restraint voltage of the phase starting relay component 36, is related to $\bar{V}-\bar{I}\bar{Z}k$ by substantially the same fixed percentage that was referred to above in connection with the operating voltage.

Voltage $\bar{V}$ is also utilized to restrain operation of relay $\phi s$. This voltage is supplied to suitable rectifying means, such as a full-wave bridge type rectifier 57, where it is converted to a more useful unidirectional restraint voltage. An adjustably tapped resistor 58 having a slider 58a is connected between positive and negative D.-C. terminals of rectifier 57. Slider 58a is connected to negative bus. The unidirectional voltage appearing between slider 58a and the negative terminal of rectifier 57 is smoothed by a filter capacitor 59, and this voltage, which comprises the effective non-offset restraint voltage of the component 36, is related to $\bar{V}$ by substantially the same fixed percentage that was referred to above in connection with the operating voltage.

The negative terminal of rectifier 52 is coupled to the negative terminal of rectifier 47 through a one-way electric valve or rectifier 60 which permits current flow only in a direction toward rectifier 47. Similarly, the negative terminal of rectifier 57 is coupled to the negative terminal of rectifier 47 through another rectifier 61 which permits current flow only in a direction toward rectifier 47. The positive D.-C. terminal of rectifier 47 is tied to negative bus through suitable impedance means such as resistor 62, and the negative bus as previously stated is connected to sliders 55a and 58a of tapped resistors 55 and 58 respectively. The connections just described form a pair of closed direct current loops each of which shares a common path including rectifier 47 and resistor 62 as shown in Fig. 2. Due to rectifiers 60 and 61, current may flow through resistor 62 only in a direction from the positive terminal of rectifier 47 to negative bus. Since the operating and restraining voltages are applied in opposition, direct current can flow through resistor 62, thereby developing a unidirectional voltage drop across resistor 62, only when the magnitude of operating voltage is greater than the magnitude of either the effective offset or the effective non-offset restraint voltage.

The unidirectional voltage developed across resistor 62 supplies control grid 63a of a cathode follower vacuum tube 63. Cathode 63b of tube 63 is connected to negative bus through a non-linear cathode resistor 64 which may be similar to the voltage limiters 40 and 41 described above. The cathode heater and heater circuit, being well known to those skilled in the art, have been omitted for the sake of drawing simplicity. The anode or plate 63c of tube 63 is supplied with positive potential by a voltage regulating circuit comprising resistor 65 and voltage limiter 66 connected in series circuit relationship between positive and negative bus. The quiescent or non-operating point of tube 63 corresponds to a control grid voltage of zero volts with respect to negative bus. A grid resistor 67 is provided to limit grid current whenever grid 63a is driven positive with respect to cathode 63b.

As long as no current flows through resistor 62, component 36 of relay $\phi s$ is not operated since control grid 63a is at negative bus potential and tube 63 consequently is conducting only a very small quiescent current. The moment operating voltage exceeds either of the effective restraint voltages, direct current flows in resistor 62 and the potential of grid 63a goes positive with respect to negative bus. As a result, conduction in tube 63 immediately increases. The increased tube current produces a resultant unidirectional voltage signal across cathode resistor 64. By means of a conductor 68a connected to the positive terminal of cathode resistor 64, this resultant unidirectional voltage signal is supplied to the succeeding relay circuit which responds by producing an output control signal as will be described hereinafter. By using a non-linear cathode resistor 64, the resultant signal can be limited to a desirable maximum voltage level regardless of the magnitude of voltage supplied to grid 63a. Use of the regulating circuit in the plate voltage source permits a substantially constant quiescent tube current to be maintained, thereby producing a substantially constant quiescent voltage drop across cathode resistor 64, regardless of fluctuations of supply voltage. Voltage limiter 66, which preferably is similar to limiters 40 and 41 described above, changes resistance inversely as the voltage across it changes. Therefore the proportion of increasing or decreasing supply voltage appearing across limiters 66 decreases or increases respectively, and the magnitude of plate voltage with respect to negative bus remains substantially constant.

Extremely fast response is required of phase starting relay $\phi s$ whenever a transmission line phase fault occurs within the operating range defined by locus L$\phi s$. It is well known that a sudden increase in transmission line current $\bar{I}$ and/or a sudden decrease of voltage $\bar{V}$ must accompany phase fault conditions. We utilize these transient phenomena to increase the speed of response of relay $\phi s$. A current coupling capacitor 69 is connected between negative bus and the negative D.-C. terminal of rectifier 47. Under steady-state non-operating conditions, the voltage across capacitor 69 is equal to the unidirectional operating voltage and the positive terminal of rectifier 47 is at the potential of negative bus. Upon a sudden increase in current $\bar{I}$, voltage $\bar{I}Zn$ correspondingly increases and the positive terminal of rectifier 47 must instantly go positive with respect to negative bus since the potential of the negative terminal can not be changed instantaneously due to capacitor 69. As a result, current immediately flows through resistor 62 thus energizing tube 63 and producing a resultant signal at conductor 68a. A resistor 51 is connected across rectifier 47 to provide a discharge path for capacitor 69 following the restoration of normal system conditions. A potential coupling capacitor 70 is connected between the negative terminal of rectifier 57 and control grid 63a. Under steady-state non-operating conditions, the voltage across capacitor 70 is equal to the effective non-offset restraint voltage and grid 63a is at the potential of negative bus. Upon a sudden decrease in voltage $\bar{V}$, the potential of the negative terminal of rectifier 57 must immediately become less negative, because the positive terminal of this rectifier is tied to negative bus by slider 58a. Since the voltage across capacitor 70 cannot change instantaneously, the voltage level at grid 63a is instantly driven less negative or more positive with respect to negative bus, and tube 63 conducts to produce a resultant signal. The transient responsive devices just described may momentarily produce a resultant unidirectional voltage signal in response to a sudden current or voltage change caused by a condition other than a fault within locus $L\phi s$ of relay $\phi s$. However, a continuous resultant signal can be produced only while the operating voltage is greater than either of the effective restraint voltages. Since relay $\phi s$ is utilized to prevent or block tripping, no false tripping can result and the resulting increase in speed of response during correct operation adequately compensates for occasional, momentary unnecessary operations.

The operation of component 36 of phase starting relay $\phi s$ to produce a resultant signal at conductor 68a should now be clear. Assume that a phase fault condition involving transmission line conductors 11' and 12' is located within the operating range of relay $\phi s$ and at a point behind terminal 14 with respect to terminal 15. The magnitude of $\bar{V}$ respresenting transmission line voltage is less than the magnitude of the resulting transmission line current $\bar{I}$ multiplied by the predetermined constant impedance $Zn$. Consequently, the effective non-offset restraint voltage at tapped resistor 58 is less than the operating voltage at rectifier 47 and a resultant signal is produced. Assume now that a phase fault occurs within the operating range of $\phi s$ and at a point beyond terminal 15. The vector $\bar{V}$ representing transmission line voltage minus the offset voltage $\bar{I}\bar{Z}k$ has less magnitude than the resulting transmission line current $\bar{I}$ multiplied by the predetermined constant impedance $Zn$. Consequently, the effective offset restraint voltage at tapped resistor 55 is less than the operating voltage at rectifier 47 and a resultant signal is produced. $Zn$ and $\bar{Z}k$ have been selected to obtain optimum transmission line coverage by relay $\phi s$. As can be seen in Fig. 4a, the locus $L\phi s$ of the operating limits of relay $\phi s$ circumscribes approximately the length of the protected transmission line in both directions from both terminals 14 and 15. This coverage encompasses not only the operating region of the phase tripping relay $\phi t$ located at local terminal 14, as defined by curve $L\phi t$ in Fig. 4a, but also the operating region of the phase tripping relay $\phi t$ located at the remote terminal 15. Thus, any fault condition detected by a phase tripping relay $\phi t$ at either terminal of the protected transmission line will also cause operation of the phase starting relays at both terminals.

Component 37 is identical to component 36 and produces a resultant unidirectional signal at a conductor 68b in response to any phase fault located within the locus $L\phi s$ and involving transmission line conductors 12' and 13'. Similarly, component 38 produces a resultant unidirectional signal at a conductor 68c in response to any phase fault located within the locus $L\phi s$ and involving transmission line conductors 13' and 11'. Each conductor 68a, 68b, and 68c is connected through a rectifier, 71a, 71b and 71c respectively, to a common lead 72. The rectifiers 71a, 71c, are arranged to isolate each conductor, 68a, 68c, along with its preceding circuit in component 36, 37, or 38.

Lead 72 comprises an input circuit for a level detector 73 which has been shown in block form in Fig. 2. For the purposes of this specification the term level detector is used to designate a device such as an electronic switch, i.e., means responsive to an input signal of at least a predetermined instantaneous value for producing substantially instantaneously an output signal of predetermined constant characteristic. Any suitable circuit can be used for level detector 73. For example, the arrangement shown in Fig. 1 of a copending application S.N. 500,475, filed on April 11, 1955, by Merwyn E. Hodges and Harold T. Seeley and assigned to the present assignee, which is described in detail and claimed therein, is particularly well suited. Such a circuit has the desirable features of extremely fast pickup and cutoff times, selectable pickup with respect to input signal level, and a high degree of accuracy which is maintained during fluctuations of supply voltage and variations of ambient temperature. Level detector 73 produces a constant magnitude output voltage substantially instantaneously when supplied with a resultant signal of only a slightly positive value with respect to the quiescent voltage drop across cathode resistor 64.

Associated with the input circuit of level detector 73 is a drop-out delay circuit. The function of this delay circuit is to delay only the decay of a resultant unidirectional voltage signal, whereby the output voltage of level detector 73, which is utilized to start carrier-current in a manner described below, will be maintained for a predetermined length of time after a phase fault external to the protected transmission line has been cleared. As a result carrier-current is maintained while other relays and the power system are permitted to return to normal conditions. Although other suitable arrangements may be employed to fulfill this function, we prefer at present to use a novel circuit which is described and claimed in the aforesaid copending application S.N. 469,947, filed on November 19, 1954, by Merwyn E. Hodges and Norman A. Koss and assigned to the present assignee. This circuit, as shown in Fig. 2, comprises a resistor 74 and capacitor 75 connected in series circuit relationship between lead 72 and negative bus, and a rectifier 76 connected across resistor 74. Rectifier 71a permits charging of capacitor 75 in response to a resultant signal while preventing discharge current from flowing through cathode resistor 64 when this signal is decreased or removed. A resistor 74 having a relatively high value of resistance is used to minimize loading and therefore substantially to prevent the delay circuit from draining appreciable power from the resultant signal supplied to level detector 73. Thus the build-up time of a resultant signal is substantially unaffected by this drop-out delay circuit. Rectifier 76 is arranged to provide a shunt path having negligible resistance around resistor 74 for capacitor discharging current. Whenever the resultant signal is removed, capacitor 75 discharges directly into level detector 73. Thus, the resultant signal will be maintained for a period of time determined by the capacitance 75, the charge accumulated by capacitor 75, and the resistance of the discharge path in level detector 73.

The output voltage of level detector 73 supplies the control grids of two cathode follower vacuum tubes 77 and 78. Tube 77 is provided to develop an output control signal which starts carrier-current, while tube 78 is provided to develop a coordinating signal which is supplied to phase tripping relay φt. Control grid 77a of tube 77 is connected to the output circuit of level detector 73 through a grid resistor 79 which limits grid current. Cathode 77b of tube 77 is connected through a cathode resistor 80 to negative bus, and plate 77c is connected to positive bus by means of a lead 81 and switch contact 30 of the electromagnetic relay 27 shown in Fig. 3. With contact 30 closed, presence of the level detector 73 output voltage at grid 77a causes full conduction by tube 77, and the resulting voltage drop developed across cathode resistor 80 provides an output control signal from a low impedance source. By means of a conductor 82 connected to the positive terminal of resistor 80, the output control signal is supplied to control relay CR, shown in Fig. 3. In a manner to be described below, this signal starts the transmission of carrier-current from the associated transmitter T. Contact 30 is provided in the plate circuit to disable tube 77, thus preventing the transmission of carrier-current, as long as circuit breaker 14 is open. It would be possible without this feature to start carrier-current momentarily, thereby undesirably delaying tripping of circuit breaker 15, while circuit breaker 14 is open, due to a sudden decrease in voltage at conductors 11', 12' and 13', as explained above.

Control grid 78a of tube 78 is connected to the output circuit of level detector 73 through a grid resistor 83 which limits grid current. Cathode 78b of tube 78 is coupled through a capacitor 84 to negative bus. An inductor 87 in series circuit relationship with a resistor 90 provides a D.-C. path from cathode 78b to negative bus. Plate 78c is connected to positive bus. Grid 78a is energized and full conduction is reached by tube 78 substantially instantaneously in response to the output voltage of level detector 73.

Conduction by tube 78 establishes unidirectional voltage across capacitor 84 which is supplied to a time delay circuit 85. The output voltage of time delay circuit 85 comprises the coordinating signal which is supplied by a conductor 86 to the phase tripping relay φt where it supervises the output of a tripping control signal. As will be clear when the phase tripping relay φt is described below, the coordinating signal must have positive polarity with respect to negative bus and must be greater than a predetermined magnitude before an effective output control signal can be produced by relay φt. The delay introduced in the coordinating signal by the time delay circuit 85 is necessary to insure that the phase starting relay φs at the remote terminal (15) has opportunity to start carrier-current before an effective output control signal can be produced by the local phase tripping relay φt. This permits blocking to be established and prevents false tripping of the local circuit breaker during an external phase fault located beyond the remote terminal, such as shown at B in Fig. 1. For correct operation of the relaying system illustrated as a preferred embodiment of our invention, a delay period of approximately .003 second is required.

Any suitable circuit may be used to perform this time delay function, but we prefer at present to use a particularly well suited circuit which is described and claimed in the aforesaid copending application S.N. 469,947, filed by Merwyn E. Hodges and Norman A. Koss. This time delay circuit 85, which provides an extremely accurate and reliable time delay, comprises a series inductor 87—capacitor 88 element connected to be charged by the unidirectional voltage established across capacitor 84, a second inductor 89 electrically connected in series circuit relation to inductor 87 and magnetically coupled thereto by means of a common iron core, and the resistor 90 connected across capacitor 88. As can be seen in Fig. 2, conductor 86 is connected to the second inductor 89, and the output voltage of the time delay circuit comprises the voltage from negative bus across capacitor 88 added to the voltage across inductor 89. The two inductors have substantially equal turns and their polarities are arranged so that increasing charging current to capacitor 88 through inductor 87 induces a voltage in inductor 89 which tends to make conductor 86 negative, while decreasing charging current induces a voltage which tends to make conductor 86 positive.

The operation of time delay circuit 85 is as follows: Upon the initiation of full conduction in cathode follower tube 78, voltage builds up across capacitor 84 and charging current begins to flow through the inductor 87 to capacitor 88. The charging current increases to a peak value and then decays until capacitor 88 is fully charged. The voltage induced in inductor 89 at first is negative but will become positive when the charging current decays from its peak value. The output voltage, which is the sum of these two voltages, passes through a critical level, which constitutes the aforesaid predetermined magnitude of positive voltage, at a very rapid rate of increase after a predetermined interval of time. Thus, the time delay circuit produces an accurate time delay which is substantially insensitive to fluctuations of supply voltage or critical voltage level. Resistor 90 improves damping action of the circuit thereby substantially preventing oscillation of the output voltage. The capacitance of capacitors 84 and 88 and the inductance of inductor 87 are selected whereby a coordinating signal of proper polarity and magnitude is produced by the time delay circuit 85 approximately .003 second after energization of tube 78.

The minimum time required by the illustrated phase starting relay φs to energize tubes 77 and 78 and thereby to produce an output control signal in response to the occurrence of a phase fault within the operating regions of relay φs has been found by tests conducted in a 60 cycles per second electric power system to be less than .002 second, and the maximum time has been found to be less than .011 second. The exact time required within these limits is determined by the magnitude of fault current and the portion of a half cycle at which the fault is initiated.

*Phase tripping relay φt*

Phase tripping relay φt operates to stop carrier-current transmission and to attempt tripping of circuit breaker 14 in response to the occurrence of a phase fault located in the direction of the protected transmission line. The operating characteristic of this relay can best be explained by reference to the graphical representations in Figs. 4a and 4c. As explained above in connection with phase starting relay φs, Fig. 4a is a conventional impedance diagram. Circle Lφt shown thereon represents the locus of impedance values which define the operating limits of relay φt as it is adjusted to operate in accordance with the preferred embodiment of our invention. Thus, whenever the apparent impedance of the transmission line, as indicated by the ratio of the voltage and current quantities supplied to relay φt by the instrument transformers at terminal 14, falls within the area circumscribed by locus Lφt, phase tripping relay φt will operate. Locus Lφt passes through origin O, and therefore relay φt will not operate in response to faults located behind terminal 14 with respect to terminal 15. This locus describes the typical operating characteristic of a mho type relay.

Fig. 4c, which is a graphical representation of the preferred operating characteristic of relay φt in terms of voltage, has been constructed by multiplying ohmic coordinates R and jX of Fig. 4a by current $\bar{I}$ flowing in the transmission line from terminal 14 toward terminal 15. As can be seen in Fig. 4c, the diameter of circle Lφt measured from the origin O (terminal 14) is vector $\bar{I}\bar{Z}m$ wherein $\bar{Z}m$ is a predetermined constant impedance built into relay φt in a manner to be described presently. Impedance $\bar{Z}m$ is known as the maximum reach of relay φt. The vector $\bar{V}$ shown in Fig. 4c is a voltage in the relay that reresents transmission line voltage at terminal 14 during a typical external phase fault, and accordingly $\bar{V}$ is proportional to current $\bar{I}$ multiplied by the apparent impedance to the fault. This voltage is utilized as a reference or polarizing quantity. Within relay $\phi t$ voltage $\bar{V}$ is vectorially substracted from the diameter voltage $\bar{I}\bar{Z}m$ to derive a net voltage vector $\bar{I}\bar{Z}m - \bar{V}$ which is utilized as an operating quantity. The angle $\theta$ defines the angle of separation between the polarizing and operating quantities. As demonstrated by Fig. 4c, whenever the phase relationship between polarizing voltage $\bar{V}$ and operating voltage $\bar{I}\bar{Z}m - \bar{V}$ is 90 degrees ($\theta'$), the head of the voltage vector ($\bar{V}'$) in accordance with fundamental principles of geometry must lie on locus $L\phi t$. Whenever the angle between $\bar{V}$ and $\bar{I}\bar{Z}m - \bar{V}$ is less than 90 degrees ($\theta''$), the apparent impedance to the fault is within the operating region or reach of relay $\phi t$ as defined by locus $L\phi t$, and relay $\phi t$ operates. For a phase fault located behind terminal 14 with respect to terminal 15, current $\bar{I}$ will reverse direction 180 degrees with respect to its forward direction toward terminal 15, and the resulting voltage $\bar{I}\bar{Z}m$ could be represented in Fig. 4c by a vector located in the the third quadrant. Since the same voltage $\bar{V}$ exists during either forward or reverse current flow, the operating voltage $\bar{I}\bar{Z}m - \bar{V}$ must necessarily be more than 90 degrees out of phase with polarizing voltage $\bar{V}$. Thus, any phase fault located behind terminal 14 will be outside the reach of relay $\phi t$.

To obtain the operating characteristic described above, the circuitry of phase tripping relay $\phi t$ shown in Fig. 2 is used. This relay comprises three components each enclosed by a broken line rectangle 93, 94, or 95 in Fig. 2. Each component responds to a phase fault within the reach of relay $\phi t$ and involving a different pair of transmission line conductors. Since all three components are internally identical, only the circuits of component 93 have been shown in detail. Component 93 is supplied by the alternating voltage between transmission line conductors 11' and 12' as reproduced by Y—Y-connected instrument potential transformers 19 and 20. Component 93 is also supplied by the alternating currents in the Y-connected secondary windings of instrument current transformers 16 and 17 which are coupled to connectors 11' and 12' respectively. Thus component 93 is supplied by electric quantities which will instantly reflect a fault condition involving phase conductors 11' and 12' or the transmission line circuits connected thereto. Similarly, component 94 is supplied by potential transformers 20 and 21 and by current transformers 17 and 18, and this component will respond to a fault condition involving phase conductors 12' and 13' or the transmission line circuits connected thereto. Again, component 95 is supplied by potential transformers 21 and 19 and by current transformers 18 and 16, and this component will respond to a fault condition involving phase conductors 13' and 11' or the transmission line circuits connected thereto.

As can be seen in Fig. 2, the secondary circuits of potential transformers 19 and 20 are coupled to two suitable transforming means 96 and 97 in component 93. Transforming means 96 is preferably a transformer including primary and secondary windings, 96a and 96b respectively, and an iron core 96c having an air gap to prevent saturation and thereby maintain a constant magnetizing impedance over a wide range of input voltages. Primary winding 96a is coupled through a resistor 98 to potential transformers 19 and 20. A capacitor 99 is connected across secondary winding 96b, and one terminal of winding 96b is connected to negative bus. Transformer 96 derives across its secondary winding 96b a polarizing voltage representative of the voltage between transmission line conductors 11' and 12' in phase angle while insulating succeeding relay circuits from the potential transformer connections. The parallel inductance-capacitance circuit comprising transformer 96 and capacitor 99 is tuned to the power system frequency and together with resistor 98 forms a memory circuit. The memory circuit will retard for a few cycles the decay in the magnitude of polarizing voltage in response to a decrease in transmission line voltage. Thus, it is assured that relay $\phi t$ will respond correctly to a phase fault of zero transmission line volts. For example, if a circuit breaker adjacent to the local terminal is closed into a solid or bolted fault, the memory circuit will maintain polarizing voltage thereby preventing operation of relay $\phi t$ until the protective devices associated with the adjacent breaker have had opportunity to operate. The memory action also insures correct response by relay $\phi t$ during a nearby arcing phase fault involving fault current having a D.-C. component. The D.-C. offset in the wave form of the fault current will result in a transmission line voltage wave form having positive and negative half cycles of unequal duration, and such a wave form reproduced in the polarizing voltage could cause, for reasons which will become apparent hereinafter, incorrect operation of relay $\phi t$. But the memory circuit maintains a symmetrical polarizing voltage of power system frequency and of adequately representative phase angle to assure correct response in the succeeding relay circuits.

Transforming means 97 is also preferably an iron core transformer having a primary winding 97a connected to potential transformers 19 and 20 and a secondary winding 97b. The voltage derived across secondary winding 97b is accurately representative of the voltage between transmission line conductors 11' and 12' both in magnitude and phase. During a phase-to-phase fault between transmission line conductors 11' and 12', the derived voltage is $2\bar{V}$ where $\bar{V}$ is directly proportional to the voltage drop along one conductor from the local terminal to the fault location or $\bar{I}\bar{Z}f$. As defined above in connection with relay $\phi s$, $\bar{Z}f$ is the apparent impedance of the transmission line from terminal 14 to the fault. During a three-phase fault, the derived voltage is $\sqrt{3}\, \bar{V}$. By using conversion factors of ½ and $1/\sqrt{3}$ respectively, the derived voltage has been shown on Fig. 4c as $\bar{V}$.

As shown in Fig. 2, component 93 of relay $\phi t$ is provided with suitable transforming means 100 which, for the purposes of the illustrated embodiment of our invention, preferably is similar to transforming means 39 and comprises a pair of primary windings 100a and 100b, a secondary winding 100c having one terminal connected to negative bus, and a common iron core 100d which has at least one air gap. The primary windings 100a and 100b are connected in the secondary circuits of current transformers 16 and 17 respectively. These two primary windings are similar to the primary windings 39a and 39b of transforming means 39 described above in connection with phase starting relay $\phi s$, and net ampere turns are determined by the vector difference of current in the transmission line conductors 11' and 12', referred to as difference current. Transforming means 100 derives across its secondary winding 100c a voltage representative of the difference current both in magnitude and phase over the operating range of current while imposing minimum burdens on current transformers 16 and 17. The magnitude of voltage across secondary winding 100c and the phase angle by which it leads the net current in the primary windings is determined by the amount of load in the secondary circuit. Due to the high percentage of total primary current used for magnetizing iron core 100d and its air gap, initial transient D.-C. offset in fault current wave form will not be appreciably reproduced in the secondary voltage. A voltage limiter 101, which may be similar to limiters 40 and 41 described in connection with transforming means 39, is connected across secondary winding 100c, to limit the maximum possible peak value of induced voltage to a safe level.

Transforming means 100 is loaded by an adjustably tapped resistor 102 connected across secondary winding 100c. In addition, a phase shifting rheostat 103 is connected across secondary winding 100c. The magnitude of voltage across the tapped portion of resistor 102, as determined by the position of a slider 102a, has a fixed relationship to the magnitude of difference current producing this voltage. The phase relationship between this voltage and the difference current is determined by the setting of rheostat 103. The relationship of voltage appearing across the tapped portion of resistor 102 to the difference current is replica impedance $\bar{Z}m$ which is the maximum reach of relay $\phi t$ at its characteristic angle (along line PR in Fig. 4a). For the purposes of the illustrated embodiment of our invention, slider 102a is adjusted until the magnitude of $\bar{Z}m$ is substantially equal to 150 percent of the impedance value of the protected transmission line extending between terminals 14 and 15, and rheostat 103 is adjusted to obtain a 60-degree phase angle characteristic. These adjustments adequately assure that any phase fault located on the protected transmission line will be detected by relay $\phi t$. During a phase-to-phase fault condition between conductors 11' and 12', the replica impedance voltage across the tapped portion of resistor 102 is $2\bar{I}\bar{Z}m$, while during a three-phase fault this voltage is $\sqrt{3}\ \bar{I}\bar{Z}m$.

One terminal of tapped resistor 102 is connected to negative bus, and slider 102a is coupled to the secondary winding 97b of transformer 97, as shown in Fig. 2. This connection is made in a manner to develop a net operating voltage comprising the voltage across winding 97b vectorially subtracted from the replica impedance voltage. This operating voltage is $2\bar{I}\bar{Z}m-2\bar{V}$ under phase-to-phase fault conditions, and $\sqrt{3}\ \bar{I}\bar{Z}m-\sqrt{3}\ \bar{V}$ under three-phase fault conditions. By using conversion factors of $\frac{1}{2}$ and $1/\sqrt{3}$ respectively, the operating voltage has been shown on Fig. 4c. It should now be apparent that our phase tripping relay $\phi t$ has the same operating characteristic in response to either phase-to-phase or three-phase fault conditions.

The polarizing voltage derived by transformer 96 serves as a control signal for a squaring amplifier 104. The squaring amplifier is employed to shape the alternating polarizing voltage into rectangular wave form. Although we do not wish to be limited thereto, the preferred form of squaring amplifier, as shown in Fig. 2, comprises a high-mu triode vacuum tube 104 which changes from cutoff to full conduction in response to only a very small change in the voltage level of its grid 104a. A parallel resistor 105-capacitor 106 circuit is connected between negative bus and cathode 104b of tube 104 to permit symmetrical operation of the amplifier. This element establishes the average cathode potential at a positive level whereby a grid voltage of zero volts with respect to negative bus lies halfway between the values of grid voltage required for cutoff and for full conduction. The polarizing voltage is applied between negative bus and 104a. A grid resistor 107 limits grid current whenever the grid 104a is positive with respect to cathode 104b. A voltage limiting circuit comprising a resistor 108 and a voltage limiter 109 is provided between transformer secondary winding 96b and grid resistor 107 to protect the amplifier from damaging high voltage levels. This circuit limits the maximum possible value of grid voltage to a safe level in a similar manner to the circuit comprising resistor 48 and voltage limiter 49 described above in connection with phase starting relay $\phi s$. Transformer coupling is provided in the plate circuit of amplifier tube 104. A primary winding 110a of an iron core transformer 110 is connected between plate 104c and positive bus. As long as no voltage is applied to grid 104a, tube 104 is conducting quiescent current of relatively constant magnitude. Whenever polarizing voltage is applied to grid 104a, the squaring amplifier tube will conduct increasing current during approximately the entire period of each positive half cycle of polarizing voltage and decreasing current during the period of each negative half cycle, and an alternating, substantially square wave polarizing voltage signal will be induced in transformer secondary winding 110b. The amplitude of the polarizing voltage signal is substantially independent of the magnitude of the transmission line voltage which produced it, but the polarizing signal has essentially a fixed phase relation to the line voltage, i. e., positive and negative half cycles of the square wave polarizing voltage signal have a fixed time relationship to the positive and negative half cycles of transmission line voltage between conductors 11' and 12' except as affected by the memory circuit described above.

The operating voltage serves as a control grid signal for another squaring amplifier 111. This device preferably is the same as amplifier 104 used to square the polarizing voltage, and as described above, includes a high-mu triode vacuum tube 111, a parallel resistor 112-capacitor 113 circuit for biasing the cathode, a grid resistor 114, a voltage limiting circuit comprising a resistor 115 and limiter 116, and a primary winding 117a of a transformer 117 connected in the plate circuit. The transformer secondary winding 117b produces an alternating substantially square wave operating voltage signal having independent amplitude but a fixed phase relation to the vectorial difference between the replica impedance voltage and the voltage derived from transmission line voltage. Since voltage of only a slightly positive or negative value with respect to negative bus will cause tube 111 to conduct changing current, a correct operating voltage signal is produced even when the magnitude of derived voltage $\bar{V}$ is almost equal to the magnitude of the replica impedance voltage $\bar{I}\bar{Z}m$.

As demonstrated by Fig. 4c, the operating voltage signal will be less than 90 degrees out-of-phase with the polarizing voltage signal whenever a phase fault occurs within the preferred operating region of relay $\phi t$ as defined by locus $L\phi t$. Whenever a phase fault occurs outside the operating region of relay $\phi t$, the operating voltage signal is necessarily more than 90 degrees out-of-phase with respect to the polarizing voltage signal. To develop a resultant signal which will indicate the phase relationship between the operating and polarizing voltage signals, and thereby determine the position of a phase fault, we provide a phase discriminating circuit. The phase discriminating circuit may be of any suitable type, but for the purposes of the illustrated embodiment of our invention we have been able to obtain particularly desirable results by using the novel circuit described and claimed in co-pending application S. N. 105,962, filed on December 30, 1957, by Merwyn E. Hodges and Norman A. Koss and assigned to the present assignee. With this arrangement, which is illustrated in Fig. 2, the operating voltage signal drives current through a resistor 118 to produce a resultant unidirectional voltage, while the polarizing voltage signal performs a supervising function and renders the operating signal ineffective to produce the resultant voltage whenever these two signals have opposite polarities. Thus, the phase discriminating circuit operates to develop substantially constant magnitude resultant voltage across resistor 118 only when the polarizing and operating voltage signals have like polarities.

As can be seen in Fig. 2, two voltage dividing resistors 119 and 120 having equal values of resistance are connected in series circuit relationship across the transformer secondary winding 110b, and the common point between these resistors is connected to negative bus.

The transformer 117 is loaded by an impedance element 121 having a non-linear current-voltage characteristic connected across secondary winding 117b. This element preferably is similar to the voltage limiters 40 and 41 described above in connection with phase starting relay $\phi s$, and it is employed to limit the operating voltage signal of transformer 117 to a value which is always less than the value of the polarizing voltage signal across resistors 119 and 120. By using a non-linear element, the limiting effect is greatest at peak values of voltage and therefore the squareness of the operating voltage signal waveform is improved. Two rectifiers 122 and 123 are connected in series circuit opposing relationship across the pair of resistors 119 and 120, and the common point between these rectifiers is connected to the common point between the resistors. This common point is connected to one terminal of resistor 118 and is also tied to negative bus. The terminal of transformer secondary winding 110b which is connected to resistor 119 and rectifier 122 has been marked with the reference letter C in Fig. 2, and the opposite terminal has been marked D. Whenever terminal C is positive polarity with respect to terminal D, rectifier 122 will act as a shunt path around resistor 119 and substantially the entire polarizing voltage signal will appear across resistor 120. Similarly, whenever terminal C is negative with respect to terminal D, rectifier 123 will act as a shunt path around resistor 120 and substantially the entire polarizing voltage signal will appear across resistor 119. A second pair of series connected opposing rectifiers 124 and 125 are connected across impedance element 121. The common point between these rectifiers is connected to the other terminal of resistor 118, and rectifiers 124 and 125 are arranged to permit the flow of current only in the direction toward resistor 118. The terminals of transformer secondary winding 117b corresponding to terminals C and D of secondary winding 110b have been marked by the reference letters E and F respectively. Opposite terminals of the secondary windings 110b and 117b are interconnected through rectifiers 126 and 127, with rectifier 126 arranged to permit current flow only in the direction from terminal C toward terminal F, and rectifier 127 arranged to permit current flow only in the direction from terminal D toward terminal E.

To understand the operation of this discriminating circuit, assume first that the operating and polarizing voltage signals have like polarities and that terminal C is negative with respect to terminal D. It necessarily follows that terminal E is negative with respect to terminal F. Due to rectifier 123, terminal D can be no more positive than negative bus; therefore the potential of terminal D is equal to the potential of negative bus. In other words, both sides of rectifier 123 are at substantially the same potential of negative bus. Therefore it is possible for load current to flow from the relatively positive terminal F of transformer secondary winding 117b through rectifier 125 and resistor 118 to negative bus and hence through rectifiers 123 and 127 to terminal E, and a resultant unidirectional voltage is developed across resistor 118. Although this load current appears to flow backwards through rectifier 123, it will be observed that net current through rectifier 123 is in its forward direction due to current from terminal D of transformer secondary winding 110b which follows this shunt path around resistor 120 and which is greater than the load current.

Next assume that the polarity of the operating voltage signal reverses with respect to the polarity of the polarizing voltage signal. Terminal C remains negative with respect to terminal D, but now terminal E is positive with respect to terminal F. As reasoned above, the potential at terminal D is equal to the potential of negative bus and, therefore, terminal C is negative with respect to negative bus. Transformer 117 tends to drive current from terminal E through rectifier 124 and resistor 118 to negative bus and thence through resistor 119 and rectifier 126 to terminal F. But, in order for rectifier 126 to pass this current, terminal F must be more negative than terminal C. Since the value of operating voltage is always of lower magnitude than the value of polarizing voltage, the potential of terminal F cannot be more negative than the negative potential of terminal C even with terminal E at negative bus potential. Therefore, rectifier 126 is non-conductive and no load current can flow through resistor 118. As a result, no resultant voltage is developed.

Due to the symmetry of the phase discriminating circuit, its operation will be similar to that described above whenever terminal C is positive with respect to terminal D. It should be apparent from the above description that the phase discriminating circuit develops every half cycle a resultant unidirectional voltage impulse or block having a duration determined by the overlap between operating and polarizing voltage signals of like polarities. Thus the duration of the resultant voltage during each half cycle indicates the phase angle between the operating and polarizing signals and consequently indicates the phase angle between $I\bar{Z}m-\bar{V}$ and $\bar{V}$. For example, a resultant voltage impulse or block of greater than 90 electrical degrees' duration and a time interval or gap between blocks of less than 90 electrical degrees' duration indicate a phase angle of less than 90 degrees, and the phase tripping relay $\phi t$ preferably is designed to operate in response to a phase angle less than 90 degrees.

The positive terminal of resistor 118 is connected to a level detector 128 shown in block form in Fig. 2. Level detector 128, which may be similar to the level detector 73 used in connection with phase starting relay $\phi s$, produces a constant magnitude unidirectional voltage substantially instantaneously in response to a low value of the resultant voltage across resistor 118. The purpose of level detector 128 is to provide amplified voltage blocks each having a magnitude which remains constant regardless of the amplitude, above the aforesaid low value, of the resultant voltage impulses across resistor 118, and each having an improved rectangular wave shape.

The output voltage of level detector 128 supplies control grid 129a of a cathode follower vacuum tube 129. Cathode 129b of tube 129 is connected to negative bus through a tapped cathode resistor 130 connected in parallel circuit relationship with another cathode resistor comprising a pair of series connected resistance elements 131a and 131b. Plate 129c is connected to a source of regulated positive potential 132. The source of regulated positive potential 132, as shown in Fig. 2 by way of example, comprises a resistor 133 in series circuit relationship with a cold cathode voltage regulating OA3/VR75 gas tube 134 connected between positive and negative bus. This combination is relatively insensitive to fluctuations of supply voltage, and the positive voltage of plate 129c is thereby held substantially constant. Because variations of grid voltage affect the conductance of a vacuum tube, a rectifier 135 is provided between the grid and plate circuits of tube 129 to limit the maximum magnitude of the voltage impulses produced by level detector 128 to the substantially constant value of plate voltage. A grid resistor 136 is provided to limit grid current thereby further stabilizing the operation of tube 129. As a result, cathode follower 129, in response to energization of grid 129a by a voltage block from level detector 128, provides across cathode resistors 130 and 131a, 131b a voltage drop of substantially constant magnitude regardless of the amplitude of the resultant voltage blocks from the discriminator circuit and regardless of fluctuations of supply voltage.

The voltage across cathode resistor 130 is supplied to a level detector 137 through a block time interval detecting circuit which, in the preferred embodiment of our invention, permits operable energization of level detector 137 only in response to resultant voltage impulses or blocks of greater than 90 electrical degrees' duration. The voltage across cathode resistor 131a, 131b is supplied to another level detector 138 through a separate gap time interval detecting circuit which, in the preferred embodiment of our invention, permits operable energization of level detector 138 only in response to gaps of less than 90 electrical degrees between blocks. As will be explained below, both level detectors 137 and 138 must be operating before phase tripping relay φt can produce an output control signal. It should be obvious that under steady state conditions, since a resultant voltage block is produced by the discriminating circuit every half cycle or 180 degrees, gaps of less than 90 degrees necessarily accompany blocks greater than 90 degrees. But under certain system conditions it is possible that upon the occurrence of a phase fault outside the operating region of relay φt, an initial block greater than 90 degrees or gap less than 90 degrees may be produced. This initial false indication of a fault within locus Lφt may be caused, for example, by the first fault-current-produced block of less than 90 degrees overlapping another block of less than 90 degrees produced by the previous normal load current to give a resultant block greater than 90 degrees. Since both the initial block and the initial gap cannot have false durations, we insure correct operation of relay φt under all conditions by providing the aforesaid circuits to detect the time intervals of both the blocks and the gaps and by requiring indications from both circuits to permit production of an output control signal.

Level detectors 137 and 138 have been shown in block form in Fig. 2. Each of these devices operates to derive a unidirectional output voltage of constant magnitude substantially instantaneously when energized by a voltage of at least a predetermined pickup value, and each will maintain said output voltage until the energizing voltage is reduced to less than a predetermined cutoff value. Any suitable circuit can be used for level detectors 137 and 138. For example, an arrangement shown in Fig. 3 of the aforesaid copending application S.N. 500,475 by Merwyn E. Hodges and Harold T. Seeley, which is described in detail and claimed therein, is particularly well suited.

The block time interval detecting circuit controls the energization of level detector 137. This circuit measures the duration of each voltage impulse appearing across resistor 130, applies voltage of the predetermined pickup value to level detector 137 in response to a voltage impulse of at least a preselected duration (90 electrical degrees in the preferred embodiment of the invention), maintains voltage of greater than the predetermined cutoff value for the supplement of said preselected duration (e.g., 90 electrical degrees), and quickly resets at the end of each voltage impulse in order to accurately measure the duration of the succeeding impulse. Although other suitable time interval detecting circuits can be used, we prefer at present a novel circuit, described and claimed in the aforesaid copending application S.N. 705,962 which is especially adapted to fulfill the needs of the illustrated embodiment of our invention. The block time interval detecting circuit, as can be seen in Fig. 2, comprises a resistor 139 and a timing capacitor 140 connected in series circuit relationship across cathode resistor 130. One terminal of capacitor 140 is connected to negative bus. A rectifier 141 is connected from the positive terminal of capacitor 140 to an adjustable slider 130a which taps a portion of resistor 130. Rectifier 141 is arranged to permit easy current flow only from the positive terminal of capacitor 140 toward slider 130a. In response to the voltage drop across resistor 130 produced by a resultant voltage impulse, charging current will flow through resistor 139 to timing capacitor 140. The time constant of this charging circuit is preferably selected so that capacitor 140, in parallel combination with a capacitor 142, will charge to the predetermined pickup value of voltage of level detector 137 whenever the resultant voltage impulse is maintained for .0042 second, or 90 degrees on a 60 cycles per second basis. The maximum voltage level to which capacitors 140 and 142 can charge is determined by the portion of voltage drop across resistor 130 which is tapped by slider 130a. Slider 130a is adjusted so that the maximum level is only slightly greater than the pickup value of voltage. At the end of each voltage impulse, timing capacitor 140 rapidly discharges through rectifier 141 and the tapped portion of resistor 130.

A variable holding capacitor 142 in parallel circuit relationship with a resistor 143 is coupled to timing capacitor 140. One terminal of capacitor 142 is connected to negative bus and the other terminal is connected through a rectifier 144 to the positive terminal of capacitor 140. Rectifier 144 is arranged to permit capacitor 142 to charge simultaneously with capacitor 140 but to prevent discharge of capacitor 142 through the discharge path of capacitor 140. At the end of each voltage impulse, holding capacitor 142 discharges through resistor 143. The value of capacitance of capacitor 142 and the value of resistance of resistor 143 are preferably selected whereby .0042 second, or 90 degrees on a 60 cycles per second basis, is required for the voltage across capacitor 142 to decay from the maximum level to the predetermined cutoff value. The positive terminal of capacitor 142 is connected to level detector 137 which responds to the pickup and cutoff values of voltage as discussed above and produces a continuous output voltage whenever the resultant impulses or blocks exceed 90 electrical degrees' duration.

The output voltage of level detector 137 supplies control grid 145a of a cathode follower vacuum tube 145. The cathode of tube 145 is connected through a low impedance cathode resistor 146 to negative bus, while the plate is connected directly to positive bus. Tube 145 will attain full conduction whenever grid 145a is energized by the output voltage of level detector 137, and as a result a voltage drop is developed across resistor 146. The continuous voltage signal thereby provided will be referred to hereinafter as the block signal. The block signal is supplied to a rectifier 176 of a coincidence circuit to be described hereinafter. In addition, by means of a conductor 147a connected to the positive terminal of cathode resistor 146, this block signal is supplied to tripping auxiliary unit TX. In unit TX, shown in Fig. 3, conductor 147a connects through a rectifier 231a to one terminal of a normally open contact 226 of a seal-in electromagnetic relay 221 which is energized in response to energization of the circuit breaker trip coil 31. The other terminal of contact 226 is connected to a conductor 148a which returns to componennt 93 of phase tripping relay φt shown in Fig. 2 and connects to a trigger circuit for a perceivable operation indicator or target 149. In this manner the block signal of component 93 of relay φt is employed to operate target 149 as soon as tripping of circuit breaker 14 is initiated.

As shown in Fig. 2, the preferred target comprises a glow discharge tube 149, such as an NE16 neon tube. This tube in series circuit relationship with a normally closed push button reset switch 150 is connected across a resistor 151. Resistor 151 is connected to negative bus and through another resistor 152 to positive bus. The normal voltage across tube 149 is sufficient to sustain conduction once started, but an additional positive voltage impulse is needed to trigger the tube and initiate conduction. A resistor 153 is connected between negative bus and conductor 148a, and the block signal of component 93 is applied to this resistor in response to energization of circuit breaker trip coil 31. A capacitor 154 is connected between the positive terminals of resistors 151 and 153, and, since voltage across a capacitor cannot change instantaneously, application of the block signal to resistor 153 causes a momentary impulse of positive voltage at the positive terminal of resistor 151 which triggers tube 149. While conducting, tube 149 furnishes a visual indication that component 93 of relay $\phi t$ has operated to cause circuit breaker 14 to open. By manual operation of the push button reset switch 150, conduction by tube 149 can be stopped.

The gap time interval detecting circuit which controls energization of level detector 138 will now be described. This circuit measures the time interval between voltage impulses appearing across resistance elements 131a and 131b, applies voltage of the predetermined pickup value to level detector 138 in response to a gap of less than a preselected interval (90 electrical degrees in the preferred embodiment of the invention), and maintains voltage of greater than the predetermined cutoff value for a predetermined length of time. Although other suitable time interval detecting circuits can be used, we prefer at present a novel arrangement of elements especially adapted to fulfill the needs of the illustrated embodiment of our invention. Our gap time interval detecting circuit is shown in Fig. 2 and will be described in conjunction with Fig. 5 which comprises a family of curves representing various voltage wave forms appearing at different points in the circuit. Assuming for example that the phase angle between operating and polarizing quantities is 60 degrees, the voltage across resistors 131a, 131b can be represented in Fig. 5 by curve V131. Thus, curve V131 shows a succession of positive voltage blocks each having 120 electrical degrees' duration with 60 electrical degree gaps of substantially zero voltage (with respect to negative bus) therebetween.

The positive terminal of resistance element 131a is connected through a capacitor 155 and resistor 156 to negative bus as shown in Fig. 2. Capacitor 155 and resistor 156 form a differentiating circuit having a very short time constant. A clipping rectifier 157 is connected in parallel circuit relationship with resistor 156 to prevent the development of positive voltage with respect to negative bus across resistor 156. The wave form of voltage across resistor 156 is represented by curve V156 in Fig. 5. It can be seen that at the end of each block of voltage V131, voltage V156 instantly goes negative, and then rapidly decays to negative bus potential. As can be seen in Fig. 2, a holding capacitor 158 in parallel circuit relationship with a resistor 159 is coupled to resistor 156. One terminal of capacitor 158 is connected to negative bus and the other terminal is connected through a rectifier 160 to the common connection between capacitor 155 and resistor 156. Rectifier 160 is arranged to permit instant charging of capacitor 158 in response to a negative voltage impulse across resistor 156, but to prevent discharge of capacitor 158 through resistor 156. Holding capacitor 158 must discharge through resistor 159, and the time constant of this discharge path is preferably selected whereby .0042 second, or 90 degrees on a 60 cycles per second basis, is required for the voltage across capacitor 158 to decay to a predetermined negative level. In Fig. 5 the voltage across capacitor 158 is represented by curve V158 and the predetermined negative voltage level is indicated by a line CO. Voltage V158 is supplied to a level detector 161 shown in block form in Fig. 2. This level detector may be similar to level detector 73 described above in connection with phase starting relay $\phi s$, except that level detector 161 produces at its terminal "a" an output of negative voltage with respect to negative bus substantially instantaneously in response to an input voltage more positive than the aforesaid predetermined negative level. In other words, the predetermined level CO represents a value of voltage below which level detector 161 is cutoff. Thus, level detector 161 produces a negative output voltage at all times except during the .0042 second or 90 degrees immediately following the end of each block of voltage V131. This negative output voltage is shown in Fig. 5 by curve V161. The amplitude of voltage V161 is greater than the amplitude of voltage V131.

A cathode follower vacuum tube 162 having a cathode connected to negative bus through a cathode resistor 163 of low impedance and a plate connected directly to positive bus is provided as shown in Fig. 2. The output circuit of level detector 161 is connected in series circuit relationship with resistance elements 131a and 131b between the control grid 162a of tube 162 and negative bus, with terminal "a" of level detector 161 connected to grid 162a. The net voltage applied to grid 162a comprises voltage V161 added to voltage V131 and is represented in Fig. 5 by curve V162. A net voltage of positive potential with respect to negative bus is required to render tube 162 sufficiently conductive to produce an effective voltage drop across cathode resistor 163. Since the magnitude of the negative voltage V161 is greater than the magnitude of positive voltage V131, tube 162 can conduct effectively only while level detector 161 is cut off and a voltage block is present across resistor 131a, 131b. As described above, level detector 161 is cut off for 90 degrees following the end of each voltage block. Therefore, cathode follower tube 162 will become fully conductive at the end of any gap less than 90 degrees, and the period of effective conduction of tube 162 is a measure of the gap duration subtracted from 90 degrees. For the example shown in Fig. 5, tube 162 will conduct for a period of 30 electrical degrees. An effective unidirectional voltage is developed across cathode resistor 163 in response to full conduction by tube 162, and the magnitude of this voltage is greater than the predetermined pickup value of level detector 138.

Cathode resistor 163 is coupled to level detector 138 through a decay time delay circuit. The time delay circuit, as illustrated in Fig. 2, comprises a capacitor 164 in parallel circuit relationship with a resistor 165 coupled to cathode resistor 163. One terminal of capacitor 164 is connected to negative bus and the other terminal is connected through a rectifier 166 to the positive terminal of resistor 163. Rectifier 166 is arranged to permit instant charging of capacitor 164 by the voltage developed across the cathode resistor 163, but to prevent discharge of capacitor 164 through resistor 163. At the end of each period of conduction by tube 162, capacitor 164 must discharge through resistor 165, and a predetermined time interval is required for the voltage across capacitor 164 to decay to the predetermined cutoff value of level detector 138. The time constant of this discharge path is selected to make said predetermined time interval as long as possible consistent with instant charging of capacitor 164. The positive terminal of capacitor 164 is connected through an isolating resistor 167 to the input circuit of level detector 138. The voltage thus supplied to level detector 138 is represented in Fig. 5 by curve V164. The predetermined pickup and cutoff values of voltage for level detector 138 are also shown in Fig. 5 by lines PU and DO respectively. It is apparent that for a gap of 60 degrees as shown by way of example in Fig. 5, level detector 138 will produce a continuous output voltage. Level detector 138 produces an output voltage in the manner described above whenever the gap between resultant voltage impulses or blocks is less than 90 electrical degrees, but this output voltage may not be continuous for gaps close to the 90 degree limit, since voltage V164 may decay below DO during the resulting long time lapses between the periods of full conduction by tube 162.

Since an output voltage from level detector 138 must exist before phase tripping relay $\phi t$ can produce an output control signal, as will be explained below, we provide means to energize level detector 138 whenever the resultant voltage blocks are 180 degrees duration with no gap therebetween. This condition develops whenever the operating quantity $I\bar{Z}m - \bar{V}$ is in phase with the polarizing quantity $\bar{V}$. The input circuit of level detector 138 is supplied directly from a 180-degree block timing circuit which, as illustrated in Fig. 2 by way of example, comprises a resistor 168 and a timing capacitor 169 connected in series circuit relationship across cathode resistor 131a, 131b. One terminal of capacitor 169 is connected to negative bus. A rectifier 170 is connected from the positive terminal of capacitor 169 to the common point between resistance elements 131a and 131b. Rectifier 170 is arranged to permit easy current flow only from the positive terminal of capacitor 169 toward the common point. This circuit is essentially the same as the block timing interval detecting circuit described above. The time constant of the charging circuit for capacitor 169 is selected so that capacitor 169 charges to the predetermined pickup value of voltage for level detector 138 only after a resultant voltage impulse is maintained for .0084 second, or 180 degrees on a 60 cycles per second basis. The positive terminal of capacitor 169 is connected through a rectifier 171 to the input circuit of level detector 138. Rectifier 171 prevents charging of capacitor 169 by the voltage V164. By using this 180 degree block timing circuit, an output voltage from level detector 138 is assured for any gap less than 90 degrees including no gap at all.

The output voltage of level detector 138 supplies control grid 172a of a cathode follower vacuum tube 172. The cathode of tube 172 is connected through a low impedance cathode resistor 173 to negative bus, while the plate is connected directly to positive bus. Tube 172 will attain full conduction whenever grid 172a is energized by the output voltage of level detector 138, thereby developing a voltage drop across resistor 173. This voltage signal, which will be referred to hereinafter as the gap signal, has a magnitude substantially equal to the magnitude of the block signal. The gap signal is supplied to a rectifier 177 of a coincidence circuit which will now be described.

The coincidence circuit is employed to permit operable energization of a final level detector 174 only in response to the presence of both a block signal and a gap signal. Level detector 174, which may be similar to level detector 73 previously described, operates substantially instantaneously to produce a constant magnitude unidirectional output voltage when energized by a positive input voltage of greater than a predetermined pickup value. The coincidence circuit may be of any suitable type, and, for the purpose of illustration, is shown in Fig. 2 as comprising a resistor 175 and two rectifiers 176 and 177. One terminal of resistor 175 is connected to positive bus, and the resistance of this device is substantially greater than the resistance of either cathode resistor 146 or cathode resistor 173. For example, the resistance of resistor 175 may be ten times greater than the resistance of resistors 146 or 173. Rectifier 176 is connected to the second terminal of resistor 175 and permits direct current flow from positive bus through resistor 175, through cathode resistor 146 to negative bus. Similarly, rectifier 177 is also connected to the second terminal of resistor 175 and permits direct current flow from the positive bus through resistor 175, through cathode resistor 173 to negative bus. The second terminal of resistor 175 is also connected through a rectifier 178 to the input circuit of level detector 174, and the voltage level at this terminal with respect to negative bus comprises the input voltage for level detector 174. Whenever either the block or the gap signal is absent, the input voltage cannot exceed approximately 1/10 the supply voltage, since resistor 175 and either resistor 146 or 173, respectively, form a voltage dividing network between the positive and negative buses. The predetermined pickup value of level detector 174 is greater, in this example, than 1/10 of the supply voltage. With both signals present, the input voltage must increase to a value equal to the magnitude of the smaller of these signals, since these signals will now determine the voltage from said second terminal of resistor 175 to negative bus. The magnitudes of the block signal and the gap signal are greater than the predetermined pickup value of level detector 174. Thus, level detector 174 is operably energized and produces an output voltage only in response to the presence of both a block signal and a gap signal.

A holding circuit comprising a capacitor 179 in parallel circuit relationship with a resistor 180 is connected between the input circuit of level detector 174 and negative bus. Rectifier 178 permits very rapid charging of capacitor 179 through resistor 175, but prevents discharge of capacitor 179 through either low impedance cathode resistor 146 or 173. Resistor 180 has substantially greater resistance than resistor 175 and provides a discharge path having a long time constant for capacitor 179. The holding circuit is desirable to temporarily delay decay of the input voltage for level detector 174, thus overriding relatively short periods of zero gap signal which may exist, as described above, when the gaps between resultant voltage blocks are only slightly less than 90 degrees. As a result, whenever both block and gap signals are present, a continuous output voltage from level detector 174 is assured.

The output voltage of level detector 174 supplies the control grid of a final cathode follower vacuum tube 181. The cathode of tube 181 is connected through a cathode resistor 182 to negative bus, while the plate is connected to conductor 86 from phase starting relay ϕs. Tube 181 will conduct current effectively only when its grid is energized by the output voltage of level detector 174 and its plate is energized by a positive polarity coordinating signal which is produced by phase starting relays ϕs. Conduction by tube 181 develops a voltage drop across cathode resistor 182 which provides an output control signal from a low impedance source. The output control signal reaches an effective value as soon as the co-ordinating signal from relay ϕs exceeds its predetermined critical level. By means of a conductor 183a connected to the positive terminal of resistor 182, this output control signal is conveyed to out-of-step blocking relay OB shown in Fig. 3, and from relay OB this signal is supplied to the control relay CR. In a manner to be described below, an effective output control signal stops the transmission of carrier-current from the associated transmitter T and attempts to trip circuit breaker 14.

The time required by component 93 of phase tripping relay ϕt to energize the grid of tube 181 in response to the occurrence of a phase fault within the reach of this relay, as indicated, in the preferred embodiment of our invention by a phase angle of less than 90 degrees between operating quantity $I\bar{Z}m-\bar{V}$ and polarizing quantity $\bar{V}$ which is evidenced by resultant voltage blocks of greater than 90 electrical degrees duration and gaps of less than 90 electrical degrees, has been found by tests conducted on a 60 cycles per second electric power system to be between .004 and .012 second. The exact time required within these limits is determined by the actual phase angle between operating and polarizing quantities and the portion of a half cycle at which the fault is initiated. An effective output control signal is produced under the supervision of the delayed coordinating signal within .005 to .014 second following the occurrence of the aforesaid phase fault. It should be observed at this point that although the preferred operating characteristic of the illustrated relay ϕt is a circle as represented by locus Lϕt on the impedance diagram (Fig. 4a), this locus can be conveniently made to have other shapes which are non-circular but still symmetrical with respect to line PR. Such an alternatively shaped characteristic will result whenever our relay is adjusted to respond to a critical phase relationship between polarizing and operating quantities other than 90 degrees. For example, with reference to Fig. 4c, if the relay constants were selected so that operable response is not obtained until the angle of separation between the polarizing quantity $\bar{V}$ and the operating quantity $I\bar{Z}m - \bar{V}$ is less than a predetermined acute angle such as $\theta''$, the head of voltage vector $\bar{V}''$ would lie on the locus defining this operating characteristic which would be narrow-waisted relative to the preferred characteristic. This result is obtainable, for example, simply by changing the parameters of the block and gap time interval detecting circuits and their associated level detectors so that the critical duration of the resultant voltage blocks produced by the phase discriminating circuit to which these timing circuits are responsive is the supplement of $\theta''$. In other words, the relay $\phi t$ would produce an output control signal only when the duration of each voltage block is greater than $180 - \theta''$ electrical degrees, whereby the phase relationship between the operating and polarizing voltage signals would be within the predetermined limits defined by plus and minus $\theta''$ whenever the relay operates.

Component 94 of relay $\phi t$ is identical to component 93 and produces an effective output control signal at a conductor 183b in response to any phase fault within the reach of the relay and involving transmission line conductors 12' and 13'. Similarly, component 95 produces an effective output control signal at a conductor 183c in response to any phase fault within the reach of relay $\phi t$ and involving transmission line conductors 13' and 11'. The conductors 183a, b, and c are connected to the out-of-step blocking relay OB shown in Fig. 3. A block signal produced in each component 94 and 95 is employed to operate its associated target as was the case in component 93 described above. From component 94 this signal is conveyed to tripping auxiliary unit TX by conductor 147b and returned by conductor 148b, and from component 95 this signal is conveyed to and from unit TX by conductors 147c and 148c respectively. It should be apparent that under a 3-phase fault condition the targets in all three components will operate.

Out-of-step blocking relay OB

Out-of-step blocking relay OB has been shown in Fig. 3 partly in block form, and for the sake of drawing simplicity the connections between this relay and the instrument transformers have not been shown. The function of relay OB is to block or prevent the output control signals of phase tripping relay $\phi t$ from reaching control relay CR whenever a power swing in the electric power system is in progress. A unique characteristic of a power swing is that the apparent impedance of the transmission line changes relatively slowly. In other words, the relationship of line voltage and current at terminal 14 during a power swing changes at a slow rate while approaching the critical relationship between these quantities, as defined by locus $L\phi t$, at which relay $\phi t$ will operate, whereas under a true fault condition the rate of change is substantially instantaneous. To accomplish the aforesaid function, therefore, relay OB is designed to have an operating characteristic which circumscribes locus $L\phi t$ of relay $\phi t$. This characteristic is shown on Fig. 4a, by way of example, by circle LB. A time delay arrangement is included to delay the blocking action of relay OB until after relay $\phi t$ has opportunity to perform its tripping function in case of a true internal fault. But if a power swing has caused relay OB to operate, by the time relay $\phi t$ responds thereto the time delay circuit has operated and passage of the output control signal from relay $\phi t$ to control relay CR is prevented. Although any suitable relay may be used to perform the out-of-step blocking function, we prefer a relay particularly well suited for the purposes of the illustrated protective relaying system. This relay, which is shown partly in block form in Fig. 3, is described and claimed in Patent 2,845,581, issued to Merwyn E. Hodges and Harold T. Seeley on July 29, 1958.

As shown in Fig. 3, each conductor 183a, 183b, and 183c, is connected through a rectifier, 184a, 184b, and 184c respectively, to a common conductor 185. The rectifiers 184a, 184c are arranged to isolate each conductor, 183a, 183c, along with its preceding circuit in relay $\phi t$. An output control signal from relay $\phi t$ is supplied to the control relay CR by a lead 186 coupled to conductor 185 through a normally closed permissive contact 187 of an electromagnetic relay 188 which is selectively controlled by a time delay circuit. Thus, output control signals can be blocked by energizing relay 188 to open permissive contact 187. In the selectively controlled time delay circuit of relay OB, two triode vacuum tubes, 189 and 190, are provided to control the energization of electromagnetic relay 188. Tube 189 operates to energize relay 188 while tube 190 operates to suppress or disable tube 189 thereby preventing energization of relay 188. The plate of tube 189 is connected through the operating coil of relay 188 to positive bus, and the cathode of tube 189 is connected through a cathode resistor 191 to negative bus. A unidirectional voltage signal produced by the portion of out-of-step blocking relay OB shown in block form supplies the control grid 189a of tube 189 through an RC time delay circuit comprising resistor 192 and capacitor 193. The portion of relay OB shown in block form in Fig. 2 represents a relay arrangement, such as described in the aforesaid Patent 2,845,581 Hodges and Seeley, capable of producing a unidirectional voltage signal of predetermined magnitude and positive polarity with respect to negative bus substantially instantaneously in response to the apparent impedance of the transmission line arriving within the operation region of relay OB, as defined by locus LB, during a power swing.

The plate of tube 190 is connected directly to positive bus while the cathode of tube 190 is connected through the common cathode resistor 191 to negative bus. The control grid 190a of tube 190 normally is supplied by a positive voltage derived from a voltage dividing network connected between positive and negative buses comprising a resistor 194 in series circuit with a resistor 195 in series circuit with a resistor 196 which is normally in parallel with the impedances to negative bus of the circuits coupled to lead 186. Grid 190a is connected to the common point of resistors 194 and 195, and the terminal of permissive contact 187 coupled to conductor 186 is connected to the common point between resistors 195 and 196. The positive voltage on grid 190a renders tube 190 slightly conductive. As a result, under normal system conditions, sufficient current flows through cathode resistor 191 to raise the potential of the cathode of tube 189 to a value whereby tube 189 is biased to cutoff.

As soon as relay OB operates to produce a unidirectional voltage signal, the grid voltage of tube 189 increases with time delay to the predetermined magnitude of the signal, and tube 189 soon conducts sufficient current to energize electromagnetic relay 188 thereby opening permissive contact 187. The period of delay in energizing relay 188 is necessary when a true internal phase fault has occurred in order to give the output control signal of phase tripping relay $\phi t$ an opportunity to pass to the control relay CR via lead 186 before permissive contact 187 opens. After electromagnetic relay 188 has been energized, a subsequent output control signal from relay $\phi t$, such as caused by the apparent impedance reaching locus $L\phi t$ during the power swing, will be blocked by the open circuit at permissive contact 187. In the case of a true fault, however, the output control signal of relay $\phi t$ which is of positive polarity and greater magnitude than the voltage signal produced by relay OB, is supplied to grid 190a through permissive contact 187 before electromagnetic relay 188 is energized. Tube 190 is immediately driven to full conduction, and the resulting rise in voltage level across cathode resistor 191 will bias tube 189 whereby conduction is suppressed even with full grid voltage. In this manner, during an internal phase fault energization of relay 188 is prevented, and an output control signal of relay $\phi t$ is transmitted by lead 186 to control relay CR. Resistor 195 is required to prevent undesirable loading of the output control signal by the grid circuit of tube 190.

Control relay CR

Control relay CR operates to convert the output control signals of phase starting and tripping relays, $\phi s$ and $\phi t$ respectively, into suitable signals for energizing the carrier-current transmitter T and for initiating tripping of circuit breaker 14 respectively. Within relay CR a control signal from relay $\phi t$ effectively deenergizes transmitter T and stops carrier-current by blocking the control signal of relay $\phi s$. Certain components comprising the illustrated embodiment of control relay CR and the functions of these components are generally set out below. These components and preferred circuits therefor are described in detail and claimed in a copending patent application S.N. 471,593, filed on November 29, 1954, by Merwyn E. Hodges and assigned to the present assignee.

As can be seen in Fig. 3, conductor 82, which conveys the output control signal from relay $\phi s$ to relay CR, is connected to an oscillator 200 and to an amplifier 201 both shown in block form. Oscillator 200 is employed to convert the unidirectional control signal into an alternating voltage. The alternating voltage output of oscillator 200 is supplied to amplifier 201 which amplifies this voltage under the selective control of the signal from relay $\phi s$. In the absence of a control signal, no output can be produced by amplifier 201. The amplified alternating voltage is supplied to a push-pull amplifier 202, shown in block form, where proper power content is imparted to this voltage signal. Unidirectional control voltage is provided for push-pull amplifier 202 by a suitable rectifier 203 and filter capacitor 204 supplied by the alternating voltage output of amplifier 201. The output voltage of push-pull amplifier 202 is supplied to a rectifier 205, shown in block form, which rectifies the alternating voltage and produces a positive polarity unidirectional voltage starting signal having sufficient power content to energize carrier-current transmitter T. By means of a conductor 206, the starting signal is transmitted via tripping auxiliary unit TX to transmitter T. By using suitable improved electronic circuits for certain of the foregoing components, as described in the above mentioned copending application of Merwyn E. Hodges, S.N. 471,593, the control relay CR may be made to produce a starting signal within .0002 second following the arrival of the output control signal from relay $\phi s$.

Lead 186, which transmits an output control signal of relay $\phi t$ from relay OB to relay CR, is connected to oscillator 200 and to an amplifier 207 shown in block form in Fig. 3. Oscillator 200 converts the unidirectional control signal into an alternating voltage which is supplied to amplifier 207. A control signal of effective value must be present to render amplifier 207 operable to produce an amplified alternating voltage. A suitable rectifier 208 is connected to amplifier 207 to change the amplified alternating voltage to a negative polarity unidirectional stopping voltage of relatively large magnitude. The stopping voltage is smoothed by a filter capacitor 209 and supplied to amplifier 201 and to push-pull amplifier 202 where it rapidly and positively cuts off these amplifiers and prevents their operation. In this manner, the carrier-current starting signal of relay $\phi s$ is blocked and transmitter T is deenergized. Another suitable rectifier 210 is connected to amplifier 207 and produces a positive polarity unidirectional voltage tripping signal which is filtered by a capacitor 211. A cathode follower 212, shown in block form, is connected to capacitor 211 and operates to change the impedance of the tripping signal source to a low level without appreciable loss in voltage amplitude. The output of cathode follower 212 is supplied by means of a conductor 213 to auxiliary relay OSC where it indicates that circuit breaker 14 should be tripped. By using suitable improved electronic circuits for certain of the foregoing components, as described in the above mentioned copending application of Merwyn E. Hodges, S.N. 471,593, the control relay CR may be made to produce a tripping signal within .0002 second and stop the starting signal in less than .0007 second following the arrival of an effective output control signal from relay $\phi t$.

Auxiliary relay OSC

Auxiliary relay OSC, as shown in block form in Fig. 3, operates to produce an alternating output voltage when energized by a tripping signal from control relay CR and not energized by a blocking signal from carrier-current receiver R. The output voltage is supplied over a coaxial cable 214 to tripping auxiliary unit TX, and its presence at unit TX initiates tripping of circuit breaker 14 as will be described below. Receiver R, when energized as a result of carrier-current transmitted from the remote transmitter T, produces a negative voltage blocking signal; and this blocking signal, which is applied to relay OSC by means of a conductor 215, renders OSC inoperable to produce output voltage. Thus, tripping of circuit breaker 14 is permitted only when no carrier-current is being transmitted at the remote terminal of the protected transmission line. It should be apparent that no carrier-current is transmitted from either terminal when the phase tripping relay $\phi t$ at each terminal "sees" an internal phase fault, and this is the condition in response to which tripping is desired.

Any suitable circuit can be used as auxiliary relay OSC. For example, a particularly well suited circuit including an oscillator is described and claimed in the aforesaid copending application S.N. 471,593 by Merwyn E. Hodges. A relay such as the one referred to is capable of producing output voltage, in the absence of a blocking signal from receiver R, within .0002 second in response to energization by a tripping signal.

Tripping auxiliary unit TX

Tripping auxiliary unit TX, which is shown in Fig. 3, operates to energize trip coil 31 of circuit breaker 14 in response to receipt of the alternating output voltage of relay OSC. Auxiliary electromagnetic relays are included to provide certain circuit controlling functions in response to operation of unit TX. Certain elements of the illustrated embodiment of tripping auxiliary unit TX are generally set out below. All components of this unit and preferred circuits therefore are described in detail and claimed in Patent 2,845,582, issued to Norman A. Koss on July 29, 1958.

Coaxial cable 214, as can be seen in Fig. 3, terminates at primary winding 216a of a powdered iron core transformer 216 which is used as an isolating means as well as a voltage transforming means. Transformer secondary winding 216b is connected to a suitable rectifier element 217 wherein a unidirectional voltage is produced in response to the alternating output voltage of auxiliary relay OSC. This unidirectional voltage, which is smoothed by a filter capacitor 218, is of sufficient magnitude to trigger a thyratron element 219. When thyratron 219 fires, it conducts a relatively large tripping current which follows a path from positive bus through the operating coils of two seal-in electromagnetic relays, 220 and 221, through thyratron 219, through an auxiliary switch 222 of circuit breaker 14, and through the trip coil 31 to negative bus. This current energizes the trip coil 31 which actuates latch 32 thereby releasing switch member 33 for rapid circuit interrupting movement. The tripping current also energizes both seal-in relays 220 and 221 which operate in concert to close respective normally open contacts 223 and 224. These contacts are connected in parallel circuit relationship and when closed form with the operating coil of a suppressor electromagnetic relay 225 a shunt path around thyratron 219 for tripping current flow. Seal-in relay 220 mechanically operates a perceivable indicator or target, not shown, to indicate that the tripping auxiliary unit TX has operated to trip circuit breaker 14.

A contact 226 of seal-in relay 221 completes an electrical circuit from conductor 147a to conductor 148a when seal-in relay 221 operates thereby permitting the block signal of component 93 of relay $\phi t$ to operate target 149 as described above in connection with relay $\phi t$. Similarly, seal-in relay 221 is provided with contacts 227 and 228 to complete electrical circuits between conductors 147b and 148b and between conductors 147c and 148c respectively thereby permitting the respective block signals of components 94 and 95 to operate their associated targets. Thus, whichever component of phase tripping relay $\phi t$ operates to trip circuit breaker 14, its associated target will so indicate.

Conductors 147a, 147b, and 147c are also connected, through rectifiers 229a, 229b, and 229c respectively, to one terminal of a normally open contact 230 of the suppressor relay 225. The other terminal of contact 230 is connected to negative bus. Relay 225, which is energized when contact 223 or 224 closes, operates to discontinue the block signal of relay $\phi t$ by connecting this positive signal to negative bus. This is necessary to insure against false target indication in a component of relay $\phi t$ which operates during fault current interruption after tripping of circuit breaker 14 has been initiated by operation of a different component. Rectifiers 229a, 229b, and 229c are employed to isolate the block signal of each component 93, 94, or 95 from the other two components. A rectifier, 231a, 231b, or 231c respectively, is provided in the circuit of each conductor 147a, 147c, as shown in Fig. 3, to prevent cutoff of the associated target which would otherwise occur when this conductor is connected to negative bus through contact 230 of suppressor relay 225.

When the suppressor relay 225 operates, the output control signal of relay $\phi t$ very shortly disappears. This situation is undesirable in that it permits the resumption of carrier-current transmission from the local terminal while trip coil 31 is energized with the result that tripping of remote circuit breaker 15 may be delayed momentarily or entirely blocked until after the local circuit breaker 14 has opened. Therefore, a normally closed contact 232 of seal-in relay 221 is provided in the circuit conveying the starting signal from control relay CR to transmitter T, and upon energization of trip coil 31 contact 232 opens to insure that transmitter T remains deenergized.

As switch member 33 of circuit breaker 14 moves to its open circuit position, auxiliary switch 222 operates to interrupt tripping current thereby deenergizing trip coil 31, suppressor relay 225, and seal-in relays 220 and 221.

By using suitable improved circuits for certain of the foregoing elements, as described in the above mentioned Patent 2,845,582, Koss, the tripping auxiliary unit TX may be made to operate to energize trip coil 31 within .0003 second following receipt of output voltage from auxiliary relay OSC.

*Transmitter T and receiver R*

Transmitter T and receiver R are employed as means for obtaining intercommunication between opposite terminals of the protected transmission line. Although, for the purpose of illustration, we have shown a relaying system using the well known carrier-current pilot for transmitting signals between terminals, it should be clear that other methods of intercommunication, such as wire pilot or microwave, lend themselves equally well to our system.

The carrier-current transmitter T, shown in block form in Fig. 3, generates a high-frequency continuous signal of carrier-current in response to energization by the starting signal from control relay CR. The carrier-current flows to conductor 13 of the protected transmission line through coupling capacitor 23. Conductor 13 provides a path for this current to the remote receiver R coupled to conductor 13 by another capacitor 23 at the remote terminal. Receiver R is tuned to the frequency of the carrier-current and is energized in response to this current to produce a negative voltage blocking signal which is conveyed to auxiliary relay OSC by conductor 215. Because the transmission of carrier-current is required only to prevent tripping, if conductor 13 should fail due to an internal phase fault, the relaying system would operate correctly to trip both circuit breakers 14 and 15.

The high frequency oscillation transmitter T and receiver R may be of any suitable construction. For example, the transmitter and receiver circuits disclosed and fully described in United States Letters Patent No. 2,087,127 issued to Sporn and Muller on July 13, 1937, are readily adaptable to perform the transmitting and receiving functions in the illustrated embodiment of our invention. By using an arrangement such as this, receiver R will produce its blocking signal within .0008 second following energization of the transmitter T located at the opposite terminal, and this blocking signal will be removed within .001 second following deenergization of the transmitter T.

The overall operating time required by the illustrated embodiment of our protective relaying system to energize the trip coils 31 of circuit breakers 14 and 15 following the occurrence of a phase fault on the protected transmission line is less than one cycle on a 60 cycles per second basis under all possible conditions. Within the limits of .003 to .012 second in response to a phase fault within the operating region of phase starting relay $\phi s$, relay $\phi s$ operates, control relay CR issues a starting signal, transmitter T transmits carrier-current, and receiver R responds by producing a blocking signal at auxiliary relay OSC. Within .007 to .016 second following any internal phase fault, phase tripping relay $\phi t$ operates, control relay CR responds to stop the starting signal and to energize relay OSC, transmitter T is deenergized and receiver R removes its blocking signal from relay OSC, tripping auxiliary unit TX operates, and trip coil 31 is energized. By tests conducted in a 60 cycles per second electric power system we have found that the average overall operating time of our relaying system is ⅝ cycle or approximately .011 second.

While we have shown and described a preferred form of our invention by way of illustration, many modifications will occur to those skilled in the art. We therefore contemplate by the appended claims to cover all such modifications as fall within the true spirit and scope of our invention.

What we claim as new and desire to secure by Letters Patents of the United States is:

1. In a fault responsive protective relaying system for an electric power transmission line having spaced apart terminals each including electroresponsively tripped circuit interrupting means for coupling said transmission line in an alternating current electric power system, a signal transmitting and a signal receiving means located at each terminal, signal channel means coupling each said transmitting means to the receiving means, an impedance type relay located at each terminal and responsive to an operating voltage derived from the current in said transmission line and to a restraining voltage comprising the vectorial difference between a first alternating voltage proportional to the transmission line voltage and a first component voltage derived from the transmission line current or comprising said first alternating voltage alone in the absence of said first component voltage, said impedance type relay being operable to produce a first control voltage whenever the difference in magnitude between said operating voltage and said restraining voltage exceeds a predetermined value, a first control means responsive to said first control voltage for energizing the associated said signal transmitting means, coordinating means associated with each impedance type relay and responsive to said first control voltage to produce after a predetermined time interval a second control voltage, a mho type relay located at each terminal and responsive to the phase relationship between a second alternating voltage proportional to the transmission line voltage and a voltage representative of the vectorial difference between said second alternating voltage and a second component voltage derived from the transmission line current, said mho type relay being operable to produce a third control voltage whenever said phase relationship is within predetermined limits, voltage responsive means responsive to both said second and third control voltages to produce a resultant control voltage, second control means responsive to said resultant control voltage for deenergizing the associated said signal transmitting means, third control means operable in response to said resultant control voltage to initiate tripping operation of the associated circuit interrupting means, said third control means being rendered inoperable by the associated said signal receiving means upon receipt of a signal from said transmitting means, voltage responsive target means operable to produce a perceivable signal, fourth control means operable in response to operation of said third control means to deenergize the associated said signal transmitting means and to utilize a component of said third control voltage to operate said target means, and means responsive to operation of said fourth control means for suppressing said component of said third control voltage.

2. In a fault detecting protective relaying arrangement for a polyphase alternating current electric power system having a circuit interrupter including electroresponsive tripping means, means for deriving a first voltage signal in response to predetermined phase relationships between a reference quantity proportional to the power system voltage and an operating quantity comprising the vectorial difference between a first alternating voltage derived from said power system and a voltage related to the alternating current in said power system by a first predetermined impedance, coordinating means for producing after a predetermined time interval a second voltage signal in response to at least a predetermined difference in magnitude between an electric quantity related to said alternating current by a second predetermined impedance and another electric quantity comprising the vectorial difference between a second alternating voltage derived from the power system and a voltage related to said alternating current by a third predetermined impedance or comprising the second derived voltage alone in the absence of said third impedance, voltage responsive means supplied by said first and second voltage signals and operable only in response to the presence of both said signals to develop an output control voltage, control means responsive to said output control voltage for energizing said tripping means, voltage responsive target means operable to produce a perceivable signal, and means responsive to energization of said tripping means for utilizing a component of said first voltage signal to operate said target means.

3. A relaying arrangement for an alternating current electric power circuit comprising, a mho type relay operable to produce a first voltage signal in response to a predetermined range of phase relationships between a first alternating voltage derived from the voltage of said electric power circuit and a voltage representative of the vectorial difference between said first alternating voltage and a voltage derived from the alternating current in said electric power circuit, an impedance type relay responsive to an operating quantity representative of said alternating current and a restraining quantity representative of the vectorial difference between a second alternating voltage derived from said circuit voltage and another voltage derived from said alternating current or representative of said second alternating voltage alone in the absence of said last-mentioned derived voltage, said impedance type relay operable to produce a second voltage signal after a predetermined time delay whenever the difference in magnitude between said operating and said restraining quantities exceeds a predetermined value, and voltage responsive means supplied by said first and second voltage signals for developing an output control signal only in response to the presence of both said voltage signals.

4. An impedance type relay for an alternating current electric power system comprising, means responsive to alternating current derived from the system for producing a unidirectional operating voltage, means responsive to alternating current derived from the system for developing an alternating voltage related to said alternating current by a predetermined impedance, means responsive to the vectorial difference between said developed voltage and an alternating voltage derived from the system for producing a unidirectional restraining voltage, and means supplied by said operating and restraining voltages for producing an output control signal in response to at least a predetermined difference in magnitude between said operating voltage and said restraining voltage.

5. An impedance type relay for an alternating current electric power system comprising, at least one means responsive to alternating current derived from the system for producing a unidirectional operating voltage, means responsive to alternating voltage derived from the system for producing a first unidirectional restraining voltage, means responsive to alternating current derived from the system for developing an alternating voltage related to said alternating current by a predetermined impedance, means for vectorially adding said developed voltage and an alternating voltage derived from the system to obtain a total alternating voltage, means responsive to said total alternating voltage for producing a second unidirectional restraining voltage, and means supplied by said operating and said first and second restraining voltages for producing an output control signal whenever the difference in magnitude between said operating voltage and either of said restraining voltages exceeds a predetermined value.

6. An impedance type relay for an alternating current electric power system comprising, at least one means responsive to alternating current derived from the system to provide a source of unidirectional operating voltage having preselected polarity, means responsive to alternating current derived from the system to develop an alternating voltage related to said alternating current by a predetermined impedance, means responsive to the vectorial difference between said developed voltage and an alternating voltage derived from the system to provide a source of unidirectional restraining voltage, comparing means coupled to said operating and restraining voltage sources for producing a resultant unidirectional voltage signal of preselected polarity in response to at least a predetermined difference in magnitude between said operating voltage and said restraining voltage, and means including a capacitor connected to said operating voltage source to force said operating voltage to produce substantially instantaneously said resultant signal whenever said operating voltage increases suddenly in response to a sudden increase in said alternating current regardless of the magnitude of said restraining voltage.

7. An impedance type relay for an alternating current electric power system comprising, means responsive to alternating current derived from the system to provide a source of unidirectional operating voltage having preselected polarity, means responsive to alternating voltage derived from the system to provide a source of unidirectional restraining voltage, comparing means, said operating and restraining voltage sources being coupled to said comparing means in polarity opposing relationship, said comparing means operable to produce a resultant unidirectional voltage signal of pre-selected polarity in response to at least a predetermined difference in magnitude between said operating voltage and said restraining voltage, and means including a capacitor connected to said restraining voltage source to force said restraining voltage to produce said resultant signal in substantially instantaneous response to a sudden decrease in restraining voltage regardless of the magnitude of said operating voltage.

8. In an impedance type relay for an alternating current electric power system including a circuit breaker, means responsive to alternating current derived from the system to provide a source of unidirectional operating voltage having preselected polarity, means responsive to alternating voltage derived from the system to provide a source of unidirectional restraining voltage, comparing means, said operating and restraining voltage sources coupled to said comparing means in polarity opposing relationship, said comparing means operable to produce a resultant unidirectional voltage signal of preselected polarity whenever the difference in magnitude between said operating voltage and said restraining voltage is greater than a predetermined value, means including a capacitor connected to said restraining voltage source to force said restraining voltage to produce said resultant signal in substantially instantaneous response to a sudden decrease in restraining voltage regardless of the magnitude of said operating voltage, supervising means controlled by said circuit breaker to provide a supervising signal only when said circuit breaker is in its closed circuit positon, and means responsive to both said resultant signal and said supervising signal to produce an output control signal.

9. A mho type relay for an alternating current electric power system comprising, means responsive to alternating voltage derived from the system for producing a succession of reference voltage impulses of duration and polarity representative of succeeding half cycles of said derived alternating voltage, means responsive to alternating current derived from the system for developing an alternating voltage related to said alternating current by a predetermined impedance, means responsive to the vectorial difference between said derived alternating voltage and said developed alternating voltage for producing a succession of operating voltage impulses of duration and polarity representative of succeeding half cycles of the difference alternating voltage, and means responsive to said reference and operating voltage impulses to produce an output control signal whenever the phase relationship between said reference and operating impulses is within predetermined limits.

10. A mho type relay for an alternating current electric power system comprising, means responsive to alternating voltage derived from the system for producing a first substantially square wave alternating voltage having essentially a fixed phase relationship to the derived alternating voltage, means responsive to alternating current derived from the system for developing an alternating voltage related to said alternating current by a predetermined impedance, means responsive to the vectorial difference between said developed alternating voltage and the derived alternating voltage for producing a second substantially square wave alternating voltage having a fixed phase relationship to the difference voltage, discriminating means responsive to said first and second voltages for producing a succession of substantially constant magnitude unipolarity resultant voltage blocks having periods of duration corresponding to the periods during which said first and second voltages have like polarities, and means responsive to a resultant block of greater than a predetermined duration for producing an output control signal, said predetermined duration indicating a predetermined phase relationship between said first and second voltages.

11. A mho type relay for an alternating current electric power system comprising, means responsive to alternating voltage derived from the system for producing a first substantially square wave alternating voltage having essentially a fixed phase relationship to the derived alternating voltage, means responsive to alternating current derived from the system for developing an alternating voltage related to said alternating current by a predetermined impedance, means responsive to the vectorial difference between said developed alternating voltage and the derived alternating voltage for producing a second substantially square wave alternating voltage having a fixed phase relationship to the difference voltage, discriminating means responsive to said first and second voltages for producing a succession of substantially constant magnitude unipolarity resultant voltage impulses, the gaps between said resultant impulses having time intervals corresponding to the periods during which said first and second voltages have opposite polarities, and means responsive to a gap of less than a predetermined time interval for producing an output control signal, said predetermined time interval indicating a predetermined phase relationship between said first and second voltages.

12. A mho type relay for an alternating current electric power system comprising, means responsive to alternating voltage derived from the system for producing a first substantially square wave alternating voltage having essentially a fixed phase relationship to the derived alternating voltage, means responsive to alternating current derived from the system for developing an alternating voltage, means for vectorially adding said developed voltage and the derived alternating voltage to obtain a total alternating voltage, means responsive to said total alternating voltage for producing a second substantially square wave alternating voltage having a fixed phase relationship to said total voltage, phase discriminating means responsive to said first and second alternating voltages for producing a succession of substantially constant magnitude unipolarity resultant voltage impulses having periods of duration corresponding to the periods during which said first and second alternating voltages have like polarities, means responsive to a resultant impulse greater than a first predetermined duration for producing a first voltage signal, means responsive to a gap between resultant impulses of less than a second predetermined time interval for producing a second voltage signal, said gap responsive means including means responsive to a continuous resultant impulse for producing said second voltage signal, said first predetermined duration and said second predetermined time interval indicating a predetermined phase relationship between said first and second alternating voltages, and voltage responsive means supplied by said first and second voltage signals for deriving an output control signal only in response to the presence of both said voltage signals.

13. A mho type relay for an alternating current electric power system comprising, means including a parallel inductance-capacitance circuit and responsive to alternating voltage derived from the power system for producing a first symmetrical alternating voltage having essentially a fixed phase relationship to said derived voltage, said inductance-capacitance circuit tuned to the power system frequency and operable whenever said derived voltage changes to retard the resulting change of said first voltage, means responsive to alternating current derived from the power system for developing an alternating voltage, means responsive to the vectorial difference between said developed voltage and said derived voltage for producing a second symmetrical alternating voltage having a fixed phase relationship to the difference voltage, and means responsive to said first and second alternating voltages to produce an output control signal whenever the phase relationship between said first and second voltages is within predetermined limits.

14. A mho type relay for an alternating current electric power system comprising, transforming means for deriving a first alternating voltage from the power system, a resistor and a capacitor coupled to said transforming means to form therewith a memory circuit to retard change of said first alternating voltage following a change in the power system voltage, said memory circuit being tuned to the power system frequency whereby substantially only the power system frequency is reproduced in said first alternating voltage, means responsive to alternating current derived from the power system for developing an alternating voltage, means responsive to the vectorial difference between said developed alternating voltage and a second alternating voltage derived from the power system for producing a third alternating voltage having a fixed phase relationship to the difference alternating voltage, and means responsive to said first and third voltages to produce an output control signal whenever the phase relationship between said first and third voltages is within predetermined limits.

15. A mho type relay for an alternating current electric power system comprising, means responsive to alternating voltage derived from the system for producing a first substantially square wave alternating voltage having essentially a fixed phase relationship to said derived voltage, means including a predetermined constant impedance responsive to alternating current derived from the system for producing a substantially symmetrical alternating voltage having amplitude and phase characteristics related to said derived alternating current by said predetermined impedance, means responsive to the vectorial difference between said symmetrical alternating voltage and said derived alternating voltage for producing a second substantially square wave alternating voltage having a fixed phase relationship to the difference alternating voltage, and means responsive to said first and second alternating voltages to produce an output control signal whenever the phase relationship between said first and second voltages is within predetermined limits.

16. A time interval detecting electric circuit for producing an output control signal whenever a substantially constant magnitude unipolarity input voltage is discontinued for less than a predetermined interval of time comprising, voltage differentiating means including rectifying means supplied by said input voltage to produce a unidirectional voltage pulse whenever said input voltage is discontinued, time delay means responsive to said unidirectional voltage pulse to produce instantly and to maintain for said predetermined interval of time a unidirectional voltage of greater than a predetermined magnitude, means connected to said time delay means and responsive to less than said predetermined magnitude of unidirectional voltage to produce a unipolarity restraining voltage, whereby no restraining voltage is produced during said predetermined interval of time following any discontinuation of said input voltage, and means supplied by said restraining voltage and by said input voltage to derive an output control signal in response to said input voltage only in the absence of said restraining voltage, whereby said output control signal indicates that said input voltage has been discontinued for less than said predetermined interval of time.

17. A time interval detecting electric circuit for recurrently producing an output control signal whenever a substantially constant magnitude unipolarity input voltage is discontinued for less than a predetermined interval of time during any one of a series of succeeding equal periods of time comprising, voltage differentiating means including rectifying means supplied by said input voltage to produce a unidirectional voltage pulse whenever said input voltage is discontinued, time delay means responsive to said unidirectional voltage pulse to produce instantly and to maintain for said predetermined interval of time a unidirectional voltage of greater than a predetermined magnitude, normally energized means operable to derive a unipolarity restraining voltage, said normally energized means being connected to said time delay means and being rendered inoperable by unidirectional voltage of greater than said predetermined magnitude, whereby no restraining voltage is derived during said predetermined interval of time following any discontinuation of said input voltage, means supplied by said restraining voltage and by said input voltage to derive a unidirectional resultant voltage in response to said input voltage only in the absence of said restraining voltage, whereby said resultant voltage indicates that said input voltage has been discontinued for less than said predetermined interval of time, means operable in response to energization by said resultant voltage to produce an output control signal, and means supplied by said input voltage for operably energizing said output control signal producing means in response to input voltage maintained continuously during any one of said equal periods of time.

18. In a time interval detecting circuit, input terminals to which input voltage comprising a succession of substantially constant magnitude unipolarity voltage blocks of varying duration is applied, voltage differentiating means including a one-way electric valve connected to said input terminals to provide a unidirectional voltage pulse at the end of each said voltage block, first time delay means responsive to said voltage pulse for producing instantly unidirectional voltage of greater than a first predetermined magnitude and for maintaining greater than said first predetermined magnitude of unidirectional voltage for a first predetermined interval of time following the end of each said voltage block, normally energized means for deriving a unipolarity restraining voltage, said normally energized means being connected to said first time delay means and being rendered inoperable by said unidirectional voltage whenever said unidirectional voltage is greater than said first predetermined magnitude, whereby no restraining voltage is derived by said normally energized means during said first predetermined interval of time following the end of each said voltage block, voltage responsive means supplied by said input voltage and by said restraining voltage and operable to produce a unidirectional resultant voltage in response to a voltage block only in the absence of said restraining voltage, said resultant voltage thereby being produced whenever the time interval between succeeding voltage blocks is less than said first predetermined interval of time, second time delay means supplied by said unidirectional resultant voltage to delay only the decay of said resultant voltage and to retain greater than a second predetermined magnitude of said resultant voltage for at least a second predetermined interval of time following every discontinuation of operation of said voltage responsive means, means connected to said second time delay means and operable in response to energization by said resultant voltage whenever said resultant voltage is greater than said second predetermined magnitude to produce an output control signal, and means responsive to a continuous input voltage of said substantially constant magnitude to operably energize said output control signal producing means.

19. A mho type relay for an alternating current electric power system comprising, means responsive to alternating current derived from the system for developing an alternating voltage, means vectorially adding said developed alternating voltage and an alternating voltage derived from the system to obtain a resultant alternating voltage, and means responsive to predetermined phase relationships between said resultant alternating voltage and said derived alternating voltage for producing an output control signal.

20. An impedance type relay for an alternating current electric power system comprising, means responsive to the system current for producing an operating voltage, means responsive to the system voltage for producing a first restraining voltage, means responsive to the vectorial difference between the system voltage and a voltage derived from the system current for producing a second restraining voltage, and means supplied by said operating and restraining voltages for producing an output control signal whenever the voltage difference between said operating voltage and either one of said restraining voltages is more positive than a predetermined value.

21. A mho type relay for an alternating current electric power system comprising, means responsive to alternating voltage derived from the system for producing a first alternating voltage having essentially a fixed phase relationship to the derived alternating voltage, means responsive to alternating current derived from the system for developing a second alternating voltage related to said alternating current by a predetermined impedance, means responsive to the vectorial difference between said second alternating voltage and the derived alternating voltage for producing a third alternating voltage having a fixed phase relationship to the difference voltage, discriminating means responsive to said first and third voltages for producing a succession of substantially constant magnitude unipolarity resultant voltage blocks, the gaps between said resultant blocks having time intervals corresponding to the periods during which said first and third voltages have opposite polarities, voltage differentiating means supplied by said resultant voltage blocks for producing a voltage pulse at the end of each block, time delay means connected to said differentiating means to provide a unidirectional restraining voltage only after a predetermined interval of time has elapsed following each voltage pulse, and means supplied by said resultant voltage blocks and by said restraining voltage for producing an output control signal in response to the presence of a voltage block only in the absence of restraining voltage.

22. A relaying arrangement for an alternating current electric power circuit comprising, an impedance type relay energized by first and second electric quantities derived respectively from the circuit current and the circuit voltage and operable a predetermined time interval after the ratio of said first quantity to said second quantity exceeds a predetermined magnitude to produce a supervising signal, and a mho type relay energized by said first and second electric quantities and operable in response to a predetermined range of phase relationships between said second quantity and a third quantity representative of the vectorial difference between said first and second quantities, said mho relay including means connected to said impedance relay and rendered effective by said supervising signal to produce an output control signal when said mho relay is operating.

23. A time interval detecting electric circuit responsive to gaps of less than a predetermined time interval between successive blocks of unipolarity input voltage comprising, normally energized means for deriving a unipolarity restraining voltage, means supplied by said input voltage blocks and by said restraining voltage for producing an output control signal only in response to the presence of a voltage block in the absence of said restraining voltage, voltage differentiating means supplied by said input voltage blocks for producing a voltage pulse at the end of each block, and time delay means connected between said differentiating means and said normally energized means and effective only during said predetermined time interval following each voltage pulse to deenergize said normally energized means thereby discontinuing said restraining voltage.

24. The time interval detecting electric circuit of claim 23 in which timing circuit means supplied by the input voltage blocks is added for producing the output control signal whenever there is no gap between successive blocks of input voltage.

25. A relay for an alternating current electric power system comprising, means coupled to the power system for producing an operating voltage representative of an alternating electric quantity derived from the system, separate means coupled to the system for producing a reference voltage respresentative of another alternating electric quantity, discriminating means responsive to said operating and reference voltages for developing a succession of unipolarity voltage blocks having periods of duration corresponding to the periods during which said operating and reference voltages have like polarities, whereby the duration of the gaps between successive blocks corresponds to the phase relationship between the alternating electric quantities, and means responsive to a gap between successive voltage blocks of less than a predetermined time interval for producing an output control signal.

26. A relay for an alternating current electric power system comprising, means coupled to the power system for producing a first alternating voltage representative of the system voltage, separate means coupled to the system for producing a second alternating voltage representative of the vectorial difference between two derived voltages proportional respectively to the system current and the system voltage, discriminating means responsive to said first and second voltages for developing every half cycle a unipolarity voltage block having a duration corresponding to the portion of the half cycle during which said first and second alternating voltages have like polarities, whereby the gap between successive unipolarity blocks corresponds to the phase relationship between said first and second voltages, means coupled to the discriminating means and responsive to a gap of less than a predetermined time interval between successive unipolarity blocks for producing every half cycle of resultant voltage signal having a duration corresponding to the amount of time by which the gap is shorter than said predetermined time interval, and time delay means supplied by said resultant voltage signal for maintaining said signal greater than a predetermined magnitude for approximately the period of a half cycle.

27. A relay for an alternating current electric power system comprising, means coupled to the power system for producing a first alternating voltage representative of the system voltage, separate means coupled to the system for producing a second alternating voltage representative of the vectorial difference between two derived voltages proportional respectively to the system current and the system voltage, discriminating means responsive to said first and second alternating voltages for producing a succession of unipolarity voltage blocks having periods of duration corresponding to the periods during which said first and second voltages have like polarities, means responsive to a unipolarity voltage block of at least a predetermined duration for deriving an output control signal, and means responsive to an interval of less than a predetermined duration between successive voltage blocks for sustaining said output control signal.

28. A relay for an alternating current electric power system comprising, means coupled to the system for producing a first alternating voltage representative of a system quantity, separate means coupled to the system for producing a second alternating voltage representative of another quantity having a variable phase relationship with respect to said system quantity, discriminating means responsive to said first and second alternating voltages for developing a succession of unipolarity resultant voltage impulses having periods of duration corresponding to the periods during which said first and second alternating voltages have like polarities, means responsive to a resultant impulse greater than a predetermined duration for producing a first voltage signal, means responsive to a gap of less than a predetermined time interval between successive resultant impulses for producing a second voltage signal, voltage responsive means, and a coincidence circuit supplied by said first and second voltage signals and connected to said voltage responsive means for applying to said voltage responsive means an input voltage signal of greater than a predetermined value in response only to the presence of both of said first and second voltage signals, said voltage responsive means being responsive to an input signal of greater than said predetermined value for producing an output control signal.

29. The relay set forth in claim 28 in which time delay means connected to the coincidence circuit is added to delay only the decay of said input voltage signal, whereby the magnitude of the input signal applied to said voltage responsive means may be maintained greater than said predetermined value for a sufficient length of time to permit the production of a continuous output control signal.

30. An impedance type relay for an alternating current electric power system comprising, at least one means coupled to the power system to provide at least one source of unidirectional operating voltage representative of the system current, transforming means coupled to the system for deriving first and second alternating voltages proportional to system current and voltage respectively, means connected to said transforming means to provide a source of unidirectional restraining voltage representative of the vector difference between said first and second alternating voltages or of said second alternating voltage alone in the absence of said first alternating voltage, and comparing means coupled to said operating and restraining voltage sources for producing a resultant unidirectional voltage signal of preselected polarity whenever the magnitude of operating voltage exceeds the magnitude of restraining voltage.

31. In a distance relay for an alternating current electric power system, means responsive to a first electric quantity derived from a system for producing a unidirectional voltage representative of said first quantity, means responsive to a second electric quantity derived from the system and to a third electric quantity having a predetermined vectorial relationship to said first quantity for producing a unidirectional voltage representative of the vector difference between said second and third quantities, impedance means, and circuit means serially connecting both of said unidirectional voltage producing means to said impedance means in voltage opposing relationship, whereby said impedance means is energized in accordance with the difference between said unidirectional voltages whenever the magnitude of a predetermined one of said unidirectional voltages exceeds the magnitude of the other unidirectional voltage.

32. In a distance relay adapted to energize an electroresponsive device in response to predetermined magnitude and phase relationships between the current and voltage of an alternating current electric power system, first means coupled to the system for producing a unidirectional operating voltage representative of the magnitude of the system current, second means responsive to an alternating voltage proportional to the system voltage and to another alternating voltage related to system current by a predetermined constant impedance for producing a unidirectional reference voltage representative of the vector difference between said alternating voltages, and unilaterally conductive circuit means, including said first and second means interconnected in voltage opposing relationship, adapted for connection to the electroresponsive device to form a loop circuit wherein the flow of energizing current is prevented as long as the magnitude of said reference voltage is greater than the magnitude of said operating voltage.

33. In an offset-impedance relay for an alternating current electric power system: transforming means responsive to system current for deriving first and second alternating voltages related to system current by first and second predetermined constant impedances, respectively; a first full-wave rectifier having positive and negative direct current terminals and a pair of alternating current terminals; circuit means connected to said transforming means for applying said first derived voltage to the alternating current terminals of said first rectifier; a second full-wave rectifier having a pair of direct current terminals and a pair of alternating current terminals; means coupled to the power system and to said transforming means for applying to the alternating current terminals of said second rectifier a net voltage proportional to the vector difference between a preselected portion of the system voltage and said second derived voltage; a smoothing circuit connected to the direct current terminals of said second rectifier, said smoothing circuit having positive and negative terminals across which is developed a relatively smooth direct voltage representative of the voltage applied to the alternating current terminals of said second rectifier; a one-way electric valve connected between the negative terminal of said smoothing circuit and the negative direct current terminal of said first rectifier; and impedance means connected between the positive direct current terminal of said first rectifier and the positive terminal of said smoothing circuit, whereby a unidirectional voltage signal is developed across said impedance means whenever the magnitude of said direct voltage is less than the instantaneous magnitude of said first derived voltage.

34. A distance relay in an alternating current electric power system comprising, means responsive to a first alternating voltage derived from a first power system quantity for producing at least one unidirectional operating voltage representative of the magnitude of said first alternating voltage, means responsive to a second alternating voltage derived from a second power system quantity for producing a first unidirectional restraint voltage, means responsive to said second alternating voltage and to a third alternating voltage having a predetermined constant relationship to said first quantity for producing a second unidirectional restraint voltage representative of the vector difference between said second and third alternating voltages, an electroresponsive device, and a pair of loop circuit means each connecting a different one of said restraint voltage producing means in voltage opposing relationship with said operating voltage producing means to said electroresponsive device for energizing said electroresponsive device whenever the magnitude of either restraint voltage is less than the magnitude of its associated operating voltage.

35. A distance relay adapted to energize an electroresponsive device in response to predetermined current and voltage relationships in an electric power transmission system comprising, means responsive to an alternating voltage proportional to the system current for producing a unidirectional operating voltage representative thereof, means responsive to an alternating voltage proportional to the system voltage for producing a unidirectional restraining voltage representative thereof, unilaterally conductive circuit means including said operating and restraining voltage producing means interconnected in series and oppositely poled, said circuit means being connected to said electro-responsive device for energizing said device in accordance with the voltage difference between said unidirectional voltages whenever the magnitude of operating voltage is greater than the magnitude of restraining voltage, and a capacitor connected between one terminal of said operating voltage producing means and the terminal of opposite polarity of said restraining voltage producing means.

36. An impedance type relay for an alternating current electric power system comprising, first means responsive to the system current for producing a unidirectional operating voltage representative of the magnitude of system current, second means responsive to a first alternating voltage derived from the system voltage and to a second alternating voltage derived from the system current for producing a unidirectional restraining voltage representative of the vector difference between said first and said second alternating voltages, unilaterally conductive circuit means including said first and second means interconnected in series and oppositely poled, impedance means, said circuit means being connected to said impedance means to form a loop circuit wherein current flows to energize said impedance means whenever said operating voltage exceeds said restraining voltage, a first capacitor connected from the positive terminal of said first means to the negative terminal of said second means, and a second capacitor connected from the negative terminal of said first means to the positive terminal of said second means.

37. In a distance relay for a polyphase 3-wire electric power system; three separate relaying components each coupled to a different pair of wires for energization in accordance with the system current and voltage of the corresponding phase, each of said components comprising means for producing a unidirectional operating voltage representative of the energizing current, means for producing a unidirectional restraining voltage representative of the energizing voltage and comparing means supplied by said operating and restraining voltages in series opposing relationship for producing a unidirectional control voltage whenever the operating voltage exceeds the restraining voltage; voltage responsive means having an input circuit connected to all three of said relaying components for energization by the control voltages of said components, said voltage responsive means being operable to derive an output signal substantially instantaneously in response to a control voltage of at least a predetermined magnitude; and time delay means connected to said input circuit to retard only the decay of the voltage energizing said voltage responsive means.

References Cited in the file of this patent
UNITED STATES PATENTS

| | | |
|---|---|---|
| 2,454,163 | Harder | Nov. 16, 1948 |
| 2,594,371 | Ward | Apr. 29, 1952 |
| 2,641,634 | Marihart | June 9, 1953 |
| 2,673,956 | Beard | Mar. 30, 1954 |
| 2,687,511 | Penniman | Aug. 24, 1954 |